US008383062B2

(12) United States Patent
Ulmanella et al.

(10) Patent No.: US 8,383,062 B2
(45) Date of Patent: Feb. 26, 2013

(54) FLUID PROCESSING DEVICE INCLUDING SIZE-CHANGING BARRIER

(75) Inventors: Umberto Ulmanella, Foster City, CA (US); Debjyoti Banerjee, College Station, TX (US); Konrad Faulstich, Salem-Neufrach (DE); Aldrich Lau, Palo Alto, CA (US); Jun Xie, Pasadena, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 0 days.

(21) Appl. No.: 12/945,793

(22) Filed: Nov. 12, 2010

(65) Prior Publication Data

US 2011/0114206 A1 May 19, 2011

Related U.S. Application Data

(63) Continuation of application No. 12/627,824, filed on Nov. 30, 2009, now abandoned, which is a continuation of application No. 11/252,912, filed on Oct. 18, 2005, now abandoned.

(60) Provisional application No. 60/619,677, filed on Oct. 18, 2004, provisional application No. 60/619,731, filed on Oct. 18, 2004, provisional application No. 60/619,623, filed on Oct. 18, 2004.

(51) Int. Cl.
*B01L 3/00* (2006.01)
*C12Q 1/68* (2006.01)
*G01N 1/10* (2006.01)

(52) U.S. Cl. .......... 422/503; 422/50; 422/500; 422/501; 422/504; 436/180

(58) Field of Classification Search .................... 422/50, 422/100, 500, 502–504; 436/180
See application file for complete search history.

(56) References Cited

U.S. PATENT DOCUMENTS

| 4,522,923 | A | | 6/1985 | Deutsch et al. |
|---|---|---|---|---|
| 4,549,952 | A | * | 10/1985 | Columbus ...................... 204/416 |
| 4,800,066 | A | | 1/1989 | Sinclair et al. |
| 5,798,215 | A | | 8/1998 | Cathey et al. |
| 5,846,396 | A | * | 12/1998 | Zanzucchi et al. .............. 506/33 |
| 6,030,581 | A | | 2/2000 | Virtanen |
| 6,102,897 | A | | 8/2000 | Lang |
| 6,152,181 | A | | 11/2000 | Wapner et al. |
| 6,302,134 | B1 | | 10/2001 | Kellogg et al. |
| 6,375,901 | B1 | | 4/2002 | Robotti et al. |
| 6,615,855 | B2 | | 9/2003 | Lopez et al. |
| 6,755,621 | B2 | | 6/2004 | Lopez et al. |
| 2002/0054835 | A1 | | 5/2002 | Robotti et al. |

(Continued)

FOREIGN PATENT DOCUMENTS

| KR | 20040075217 | 11/2004 |
|---|---|---|
| WO | WO-98/38510 | 9/1998 |

(Continued)

OTHER PUBLICATIONS 05808640.6, Response to Office Action mailed Nov. 6, 2009, filed on May 10, 2010.
05808694.3, Response to Nov. 19, 2009 Office Action mailed, Filed on May 27, 2010.
05809896.3, Office Action mailed on Dec. 3, 2009, 2 Pgs.

(Continued)

*Primary Examiner* — Dean Kwak

(57) ABSTRACT

A diagnostic device is provided that includes a plurality of retainment regions interconnected through at least one fluid processing passageway or separated by at least one barrier. A fluid flow modulator can be provided in the fluid processing passageway if a fluid processing passageway is provided. The barrier and/or fluid flow modulator can comprise a polysaccharide, a derivative of a polysaccharide, or a combination thereof. For example, the barrier can comprise a chitosan material.

12 Claims, 27 Drawing Sheets

U.S. PATENT DOCUMENTS

| | | | |
|---|---|---|---|
| 2002/0121487 A1 | 9/2002 | Robotti | |
| 2002/0143437 A1 | 10/2002 | Handique et al. | |
| 2002/0153251 A1 | 10/2002 | Sassi et al. | |
| 2002/0194909 A1 | 12/2002 | Hasselbrink et al. | |
| 2003/0019522 A1 | 1/2003 | Parunak | |
| 2003/0210997 A1 | 11/2003 | Lopez et al. | |
| 2004/0043507 A1 | 3/2004 | Song et al. | |
| 2004/0067168 A1 | 4/2004 | Buffiere et al. | |
| 2004/0089616 A1 | 5/2004 | Kellogg et al. | |
| 2004/0096358 A1* | 5/2004 | Blankenstein et al. | 422/58 |
| 2004/0175296 A1* | 9/2004 | Opalsky et al. | 422/82.01 |
| 2004/0208792 A1 | 10/2004 | Linton et al. | |
| 2005/0244504 A1* | 11/2005 | Little et al. | 424/489 |
| 2006/0090800 A1 | 5/2006 | Banerjee et al. | |
| 2006/0093528 A1 | 5/2006 | Banerjee et al. | |
| 2010/0133104 A1 | 6/2010 | Banerjee et al. | |
| 2010/0136701 A1 | 6/2010 | Banerjee et al. | |
| 2011/0126913 A1 | 6/2011 | Banerjee | |

FOREIGN PATENT DOCUMENTS

| | | |
|---|---|---|
| WO | WO-99/06149 | 2/1999 |
| WO | WO-99/44740 | 9/1999 |
| WO | WO-01/02737 | 1/2001 |
| WO | WO-02/088296 | 11/2002 |

OTHER PUBLICATIONS 05809896.3, Response to Dec. 3, 2009 Office Action, Filed on Apr. 1, 2010.

U.S. Appl. No. 11/252,915, Office Action mailed Oct. 16, 2009, 8 Pgs.

U.S. Appl. No. 11/252,915, Office Action mailed Sep. 14, 2010, 14 Pgs.

U.S. Appl. No. 12/627,799, Office Action mailed Mar. 25, 2010, 8 Pgs.

U.S. Appl. No. 12/627,799, Office Action Mailed May 25, 2010, 13 Pgs.

U.S. Appl. No. 12/627,824, Office Action Mailed Mar. 25, 2010, 6 Pgs.

U.S. Appl. No. 12/627,824, Office Action Mailed May 12, 2010, 3 Pgs.

Beebe, et al., "Functional Hydrogel Structures for Autonomous Flow Control Inside Microfluidic Channels", *Nature* vol. 404 Apr. 6, 2000, 588-590.

EP 05808640.6, EPO Search Report mailed Jul. 31, 2009, Jul. 31, 2009, 7 Pgs.

EP 05808640.6, Office Action mailed Nov. 6, 2009, Nov. 6, 2009, 2 Pgs.

EP 05808694.3, Office Action mailed on Nov. 19, 2009, Nov. 19, 2009, 2 Pgs.

EP05809896.3, Extended European Search Report mailed Aug. 25, 2009, Aug. 18, 2009, 3 Pgs.

Iwata, et al., "Atomic Force Microscopic Analysis of a Porous Membrane with pH-Sensitive Molecular Valves", *Macromolecules*, Mar. 9, 1998, 3671-3678.

U.S. Appl. No. 11/252,915 Office Action dated Mar. 3, 2011.

U.S. Appl. No. 11/252,915 Office Action dated Sep. 14, 2010.

U.S. Appl. No. 12/954,519 Office Action dated Apr. 29, 2011.

U.S. Appl. No. 12/954,519 Office Action dated Mar. 7, 2011.

* cited by examiner

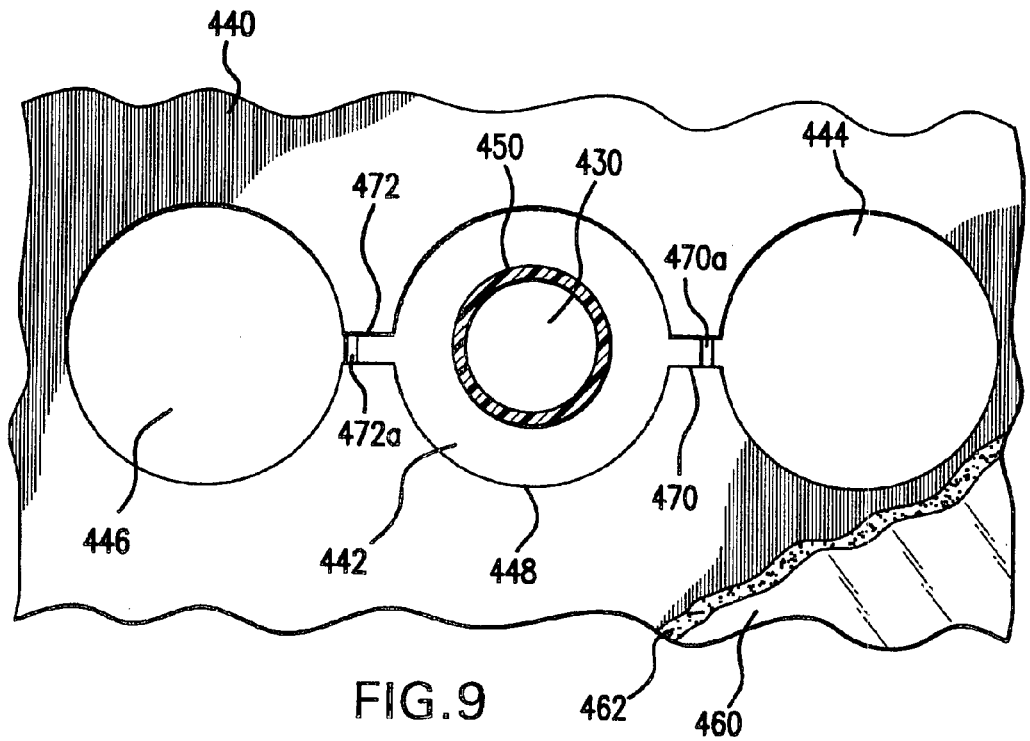

US 8,383,062 B2

FLUID PROCESSING DEVICE INCLUDING SIZE-CHANGING BARRIER

CROSS-REFERENCE TO RELATED APPLICATIONS

The present application is a continuation of U.S. patent application Ser. No. 12/627,824, filed Nov. 30, 2009 now abandoned, which is a continuation of U.S. patent application Ser. No. 11/252,912, filed Oct. 18, 2005 now abandoned, which claims the benefit of U.S. Provisional Patent Application No. 60/619,677, filed Oct. 18, 2004; and U.S. Provisional Patent Application No. 60/619,731, filed Oct. 18, 2004 and U.S. Provisional Patent Application No. 60/619,623, filed Oct. 18, 2004, the contents of each of which are entirely incorporated herein by reference.

INTRODUCTION

The present teachings relate to a diagnostic device and method providing automatically controlled interconnection between a plurality of retainment regions.

A portable or nonportable diagnostic device or method can perform a set of predetermined assays by providing for controlled interaction between various fluids initially present in separate retainment regions. A device and method compatible with nucleic acid sequence reactions, detecting such reactions, and capable of processing automatically such a reaction is desirable.

SUMMARY

According to various embodiments, a diagnostic device is provided that includes a plurality of retainment regions, as exemplified below, with the retainment regions being interconnected through a plurality of fluid communications, fluid processing passageways, flow passageways, and/or channels. Herein the phrase "retainment region" means a retainment or containment feature such as a well, a fluid retainment region, a channel, a vial, a compartment, another receptacle, a surface on which a material is retained, or the like. The following discussion with regard to retainment regions would be equally applicable to any of the above-mentioned features or their equivalents.

The retainment regions can include a reaction retainment region, one or more reagent retainment regions each containing reagents, and a sample retainment region. A pressure-actuated valve can be positioned in each of the fluid processing passageways interconnecting the one or more reagent retainment regions with respective intermediate retainment regions interposed between each of the one or more reagent retainment regions and the reaction retainment region. A barrier or fluid flow modulator, as exemplified below with reference to a valve, can be provided in one or more of the channels interconnecting the reagent retainment regions with the reaction retainment region or intermediate retainment regions, or interconnecting the intermediate retainment regions and the reaction retainment region.

According to various embodiments, a method of performing a set of predetermined assays is provided. The method can include providing a plurality of retainment regions in a closed, and if desired, disposable cuvette, with the retainment regions being interconnected by fluid processing passageways but closed to fluid flow to or from locations outside of the cuvette. First retainment regions can be selectively closed off from fluid communication with second retainment regions with which they are interconnected by first channels including pressure-actuated valves positioned therein. The pressure-actuated valves can comprise a burstable or tearable diaphragm, or other frangible seal that can rupture, tear, break, or the like, when exposed to a change in pressure, for example, an increase or decrease in pressure. One or more third retainment regions can be selectively closed off from fluid communication with at least the second retainment regions with which they are interconnected by second channels by valves positioned in the second channels. Pressure can be applied to the pressure actuated valves in the first channel sufficient to provide fluid communication between the first and second retainment regions. A sample to be tested or otherwise processed can be introduced into the one or more third retainment regions, and fluid communication can be established between the second retainment regions and the one or more third retainment regions at a controlled rate that can be a function of any one of a number of stimuli and/or characteristics of at least one of the sample in the one or more third retainment regions and a fluid within the second retainment regions. The characteristics of at least one of the sample in the one or more third retainment regions and a fluid within the second retainment region can include, but are not limited to water content, pH, chemical composition, temperature, electrical charge, magnetic properties, or the like.

The closed, and if desired, disposable cuvette, can be provided as a substrate that is fabricated from a single piece or more than one piece. The retainment regions, interconnecting fluid processing passageways, and/or valves can be fabricated all in the single piece substrate, or if desired, can be fabricated in one or more different pieces, which can then be combined to form the cuvette.

One or more third retainment regions can be selectively closed off from fluid communication with at least the second retainment regions with which they are interconnected by second channels by flow obstructions responsive to pH or other stimuli that cause a change in volume of the flow obstructions positioned in the second channels. Pressure can be applied to the pressure actuated valves in the first channels sufficient to provide fluid communication between the first and second retainment regions. A sample to be tested or otherwise processed can be introduced into the one or more third retainment regions, and fluid communication can be established between the second retainment regions and the one or more third retainment regions at a controlled rate. The controlled rate can be a function of the change in volume of the flow obstruction, such as shrinking or swelling of the flow obstruction, as caused by the pH or other characteristics of at least one of the sample in the one or more third retainment regions and a fluid within the second retainment regions. The characteristics of at least one of the sample in the one or more third retainment regions and a fluid within the second, can include, but are not limited to the water content, the pH, the chemical composition, the temperature, electrical charge, magnetic properties, or the like.

According to some embodiments, the device can comprise no vent, at least one vent, or a plurality of vents, to relieve pressure resulting from a flow of a fluid and its communication. A vent can comprise a vent channel configured to relieve such pressure. A vent can be provided in communication with a retainment region, such that upon fluid flow resultant pressure is released. A vent channel can comprise a hydrophobic vent channel that allows air to travel through the channel but does not allow the flow of an aqueous fluid.

According to some embodiments, a device is provided that can comprise no vent and can be manufactured and sealed under vacuum whereby the device can comprise a low internal gas pressure relative to the external ambient pressure.

Additional features and advantages of various embodiments will be set forth in part in the description that follows, and in part will be apparent from the description, or can be learned by practice of various embodiments. Other advantages of the various embodiments will be realized and attained by means of the elements and combinations exemplified in the application.

DRAWINGS

The skilled artisan will understand that the drawings, described below, are for illustration purposes only. The drawings are not intended to limit the scope of the present teachings in any way.

FIGS. 1(a), 1(b), and 1(c) schematically illustrate various stages in the operation of a valve according to various embodiments.

FIGS. 4A-4J schematically illustrate various stages in the operation of a diagnostic device according to an embodiment.

FIGS. 5A-5J schematically illustrate various stages in the operation of a diagnostic device according to an embodiment.

Figure 6:
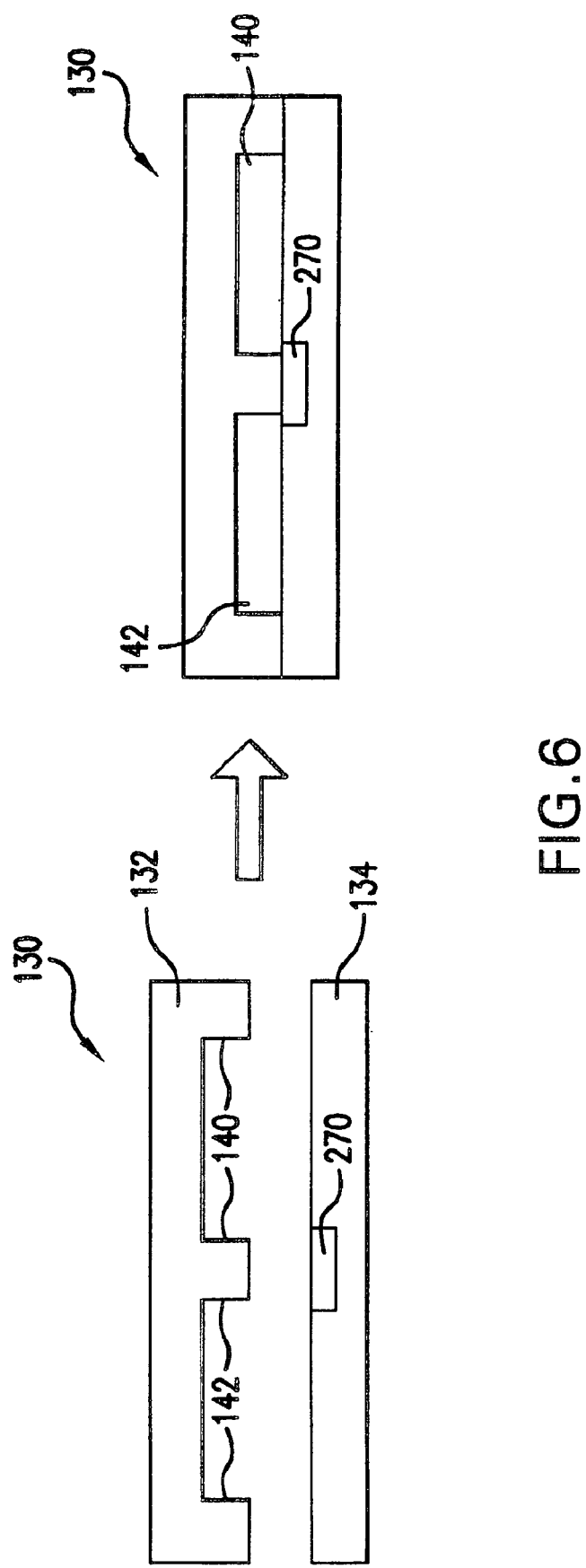

FIG. 6 illustrates the assembly of a diagnostic device from two separate pieces.

Figure 3:
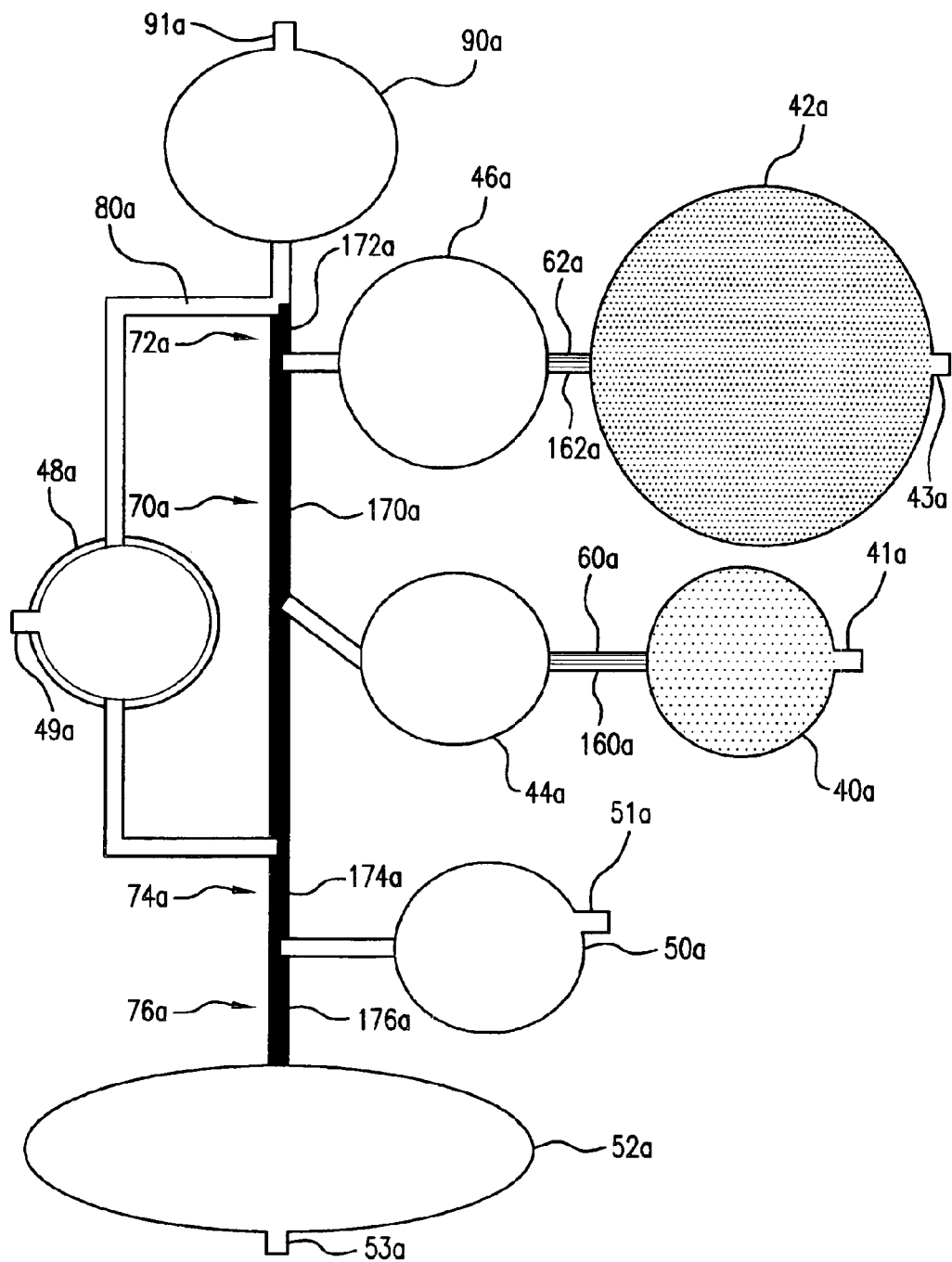
FIG. 3 is a schematic illustration of a diagnostic device according to various embodiments.
Figures 7, 8:
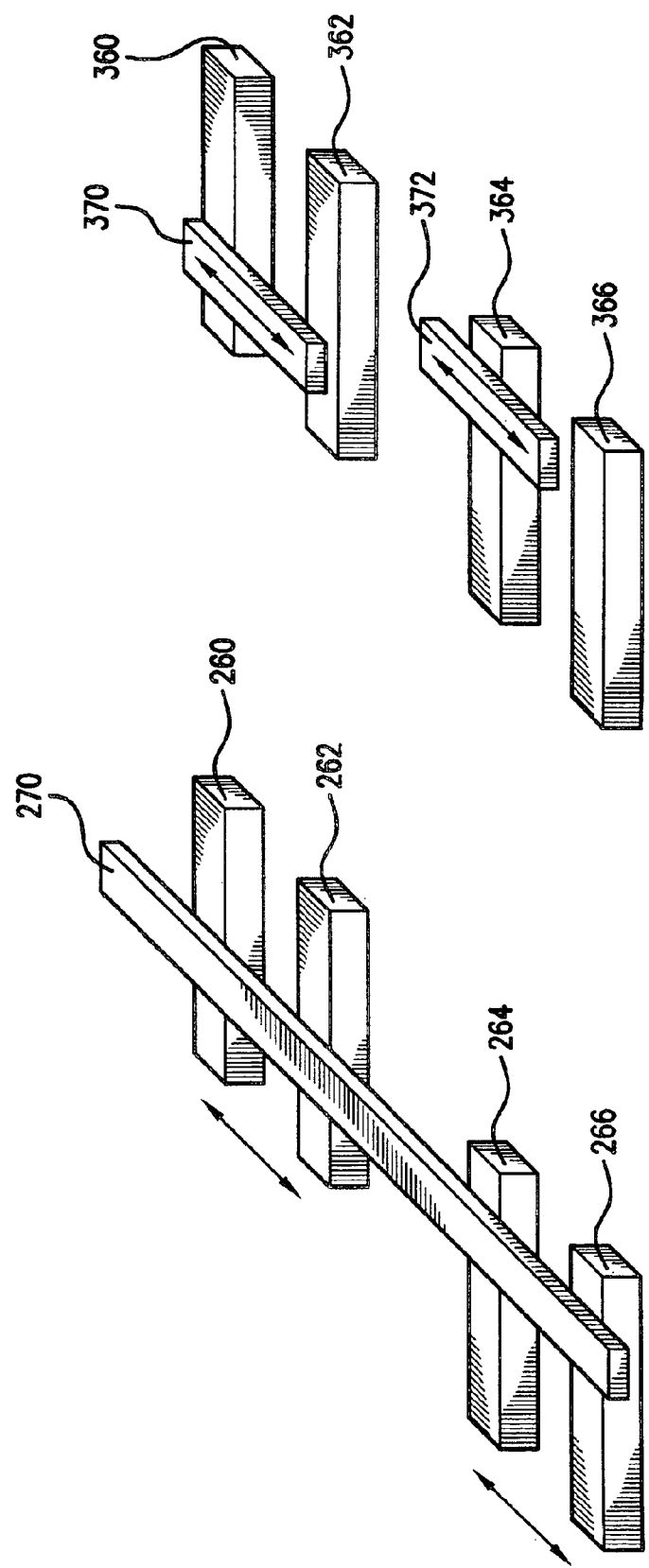

FIG. 7 illustrates the effect of misalignment of the pieces shown in FIG. 6 for an embodiment of the device as shown in FIG. 3.

Figure 2:
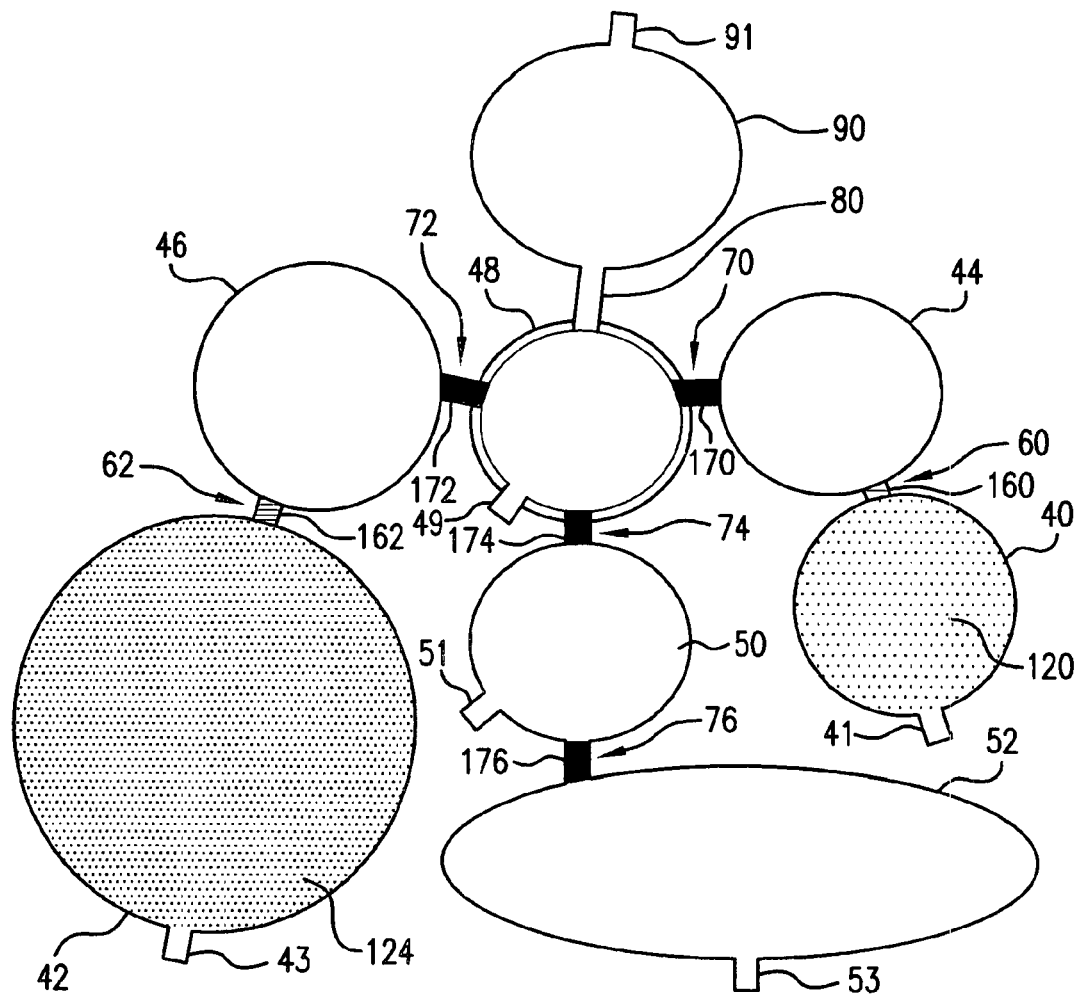
FIG. 2 is a schematic illustration of a diagnostic device according to various embodiments.

FIG. 8 illustrates the effect of misalignment of the pieces shown in FIG. 6 for an embodiment of the device as shown in FIG. 2.

FIG. 9 illustrates an arrangement of retainment regions and a valve according to various embodiments.

FIG. 10 illustrates an arrangement of retainment regions and a valve according to various embodiments.

Figure 11:
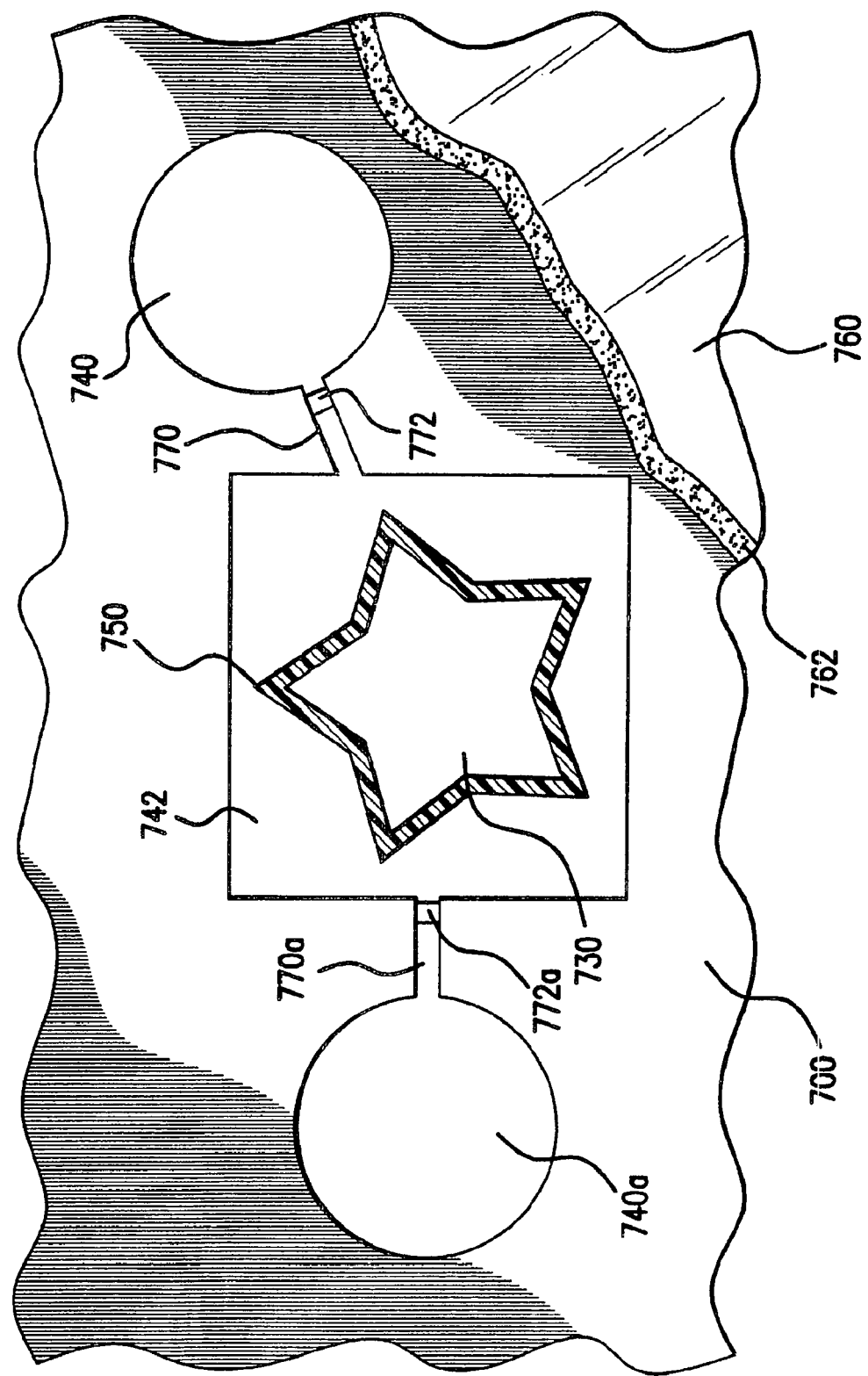

FIG. 11 illustrates an arrangement of retainment regions and a valve according to various embodiments.

It is to be understood that both the foregoing general description and the following detailed description are exemplary and explanatory only and are intended to provide a further explanation of the various embodiments of the present teachings.

DESCRIPTION OF VARIOUS EMBODIMENTS

According to various embodiments, a diagnostic device, that can be either portable or nonportable, is provided to perform one or more predetermined assays as desired, for example, in nucleic acid sequence detection technology. For a given assay, the assay protocol can involve a set of fluid handling steps such as mixing, incubation, washing, and the like, which are desirably performed in a given sequence of steps and for specified time periods for samples and reagents in specified volumes or proportions. The device can be miniaturized to the point that it can be used as a handheld portable diagnostic device. As shown in the exemplary embodiments illustrated in FIG. 2 and FIG. 3, the diagnostic device can include a plurality of fluid retainment regions, as exemplified below with reference to retainment regions, interconnected by fluid processing passageways. The plurality of retainment regions can be included within a closed, disposable cuvette such that all of the retainment regions are closed to fluid flow to or from locations outside of the cuvette. The plurality of retainment regions in the cuvette can include a reaction retainment region, one or more reagent retainment regions, each containing unreacted reagents, and a sample retainment region that can contain or receive a sample to be reacted with the unreacted reagents. The unreacted reagents, which can include enzymes, buffers, catalysts, or other reaction components, can be contained in a first set of retainment regions that are interconnected with an intermediate set of retainment regions by fluid processing passageways containing pressure-actuated valves. The intermediate retainment regions can also be connected through fluid processing passageways to a reaction retainment region, with the passageways that connect the intermediate retainment regions to the reaction retainment region comprising a material that is adapted to reduce in volume within the fluid processing passageway when brought into contact with fluids from the intermediate retainment regions, or when brought into contact with a sample after the sample has been added to the sample retainment region.

The term "fluid processing passageway" means any area, a structure, or communication, that allows for fluid communication between at least two fluid retainment regions, for example, a channel connecting two regions. One or more fluid processing passageways according to the present teachings can be configured or adapted to provide capillary driven flow. One or more fluid processing passageways according to the present teachings can be configured or adapted to provide electrokinetic driven flow. One or more of the fluid processing passageways according to the present teachings can be configured or adapted to control the rate and timing of fluid flow by varying the dimensions of the fluid processing passageway.

The terms "fluid processing passageway," "a fluid communication," "fluid flow channel," "fluid flow passageway," "flow channel," "flow control channel," and "flow control passageway," are each used synonymous with the term "fluid processing passageway," as herein defined.

According to various embodiments, the term "fluid" means a gas, an aqueous fluid, a non-aqueous fluid, a vacuum, or a partial vacuum. A gas can comprise, for example, air. For example, where two retainment regions are separated by a fluid flow modulator, one retainment region can comprise, for example, an aqueous or non-aqueous fluid retained therein, while the other retainment region can comprise a gas or a vacuum or partial vacuum, contained therein.

The term "retainment region" means any area that can comprise a reagent or other reaction component for a reaction where the fluid retainment region is in fluid communication with, fully separate from, or partially separate from, another retainment region that can comprise another reagent or reaction component for the reaction that is the same as or different from the first reagent. A first retainment region can be separate from a second retainment region, or a first retainment region can be surrounded by a second retainment region, where the first and second retainment regions are separated by a barrier comprising a shaped-wall.

A retainment region can comprise any area, structure, or form, capable of retaining a volume of fluid. A retainment region can be used, for example, to retain, process, react, store, incubate, transfer, purify, or the like, a fluid sample. A retainment region can comprise a surface area, an area, a reservoir, a recess, a fluid retainment region, a chamber, a depression, a well, a space, or the like. According to some embodiments, a retainment region can comprise, for example, a flat surfaces with hydrophobic regions surrounding hydrophilic loci for receiving, containing, retaining, or binding a sample. A retainment region can comprise any shape, for example, round, teardrop, square, polygon, star, irregular, ovoid, rectangular, or the like. A retainment region or fluid processing passageway can comprise any cross-section configuration, for example, square, round, ovoid, irregular, trapezoid, or the like.

As used herein, the term "plurality" means "two or more." Herein, the term "two or more" is used synonymously with the term "plurality."

The terms "retainment region," "fluid retainment region," "reservoir," and "region," are used synonymously herein.

The term "reagent for reaction," means one or more reagents or components necessary or desirable for use in one or more reactions or processes, for example, one or more components that in any way affect how a desired reaction can proceed. The reagent for reaction can comprise a reactive component. However, it is not necessary that the reagent participate in the reaction. The reagent for reaction can comprise a non-reactive component. The reagent for reaction can comprise a recoverable component comprising for example, a solvent and/or a catalyst. The reagent for reaction can comprise a promoter, accelerant, or retardant that is not necessary for a reaction but affects the reaction, for example, affects the rate of the reaction. The reagent for reaction can comprise one or more of a solid reagent for reaction and a fluid reagent for reaction. The term "reaction component" is used synonymous with the term "reagent for reaction," as herein defined. The reagent for reaction can comprise one or more of a fluid and a solid. A retainment region can be pre-loaded with one or more reagents for reaction.

The term "vent" means any configuration or structure that relieves vacuum and/or back pressure, or equalizes pressure in a fluid processing device. A vent can comprise a channel or a microchannel. A vent can comprise a non-flow through vent in which gas that is displaced by a fluid can collect. A non-flow through vent can comprise, for example, a hydrophobic vent.

According to various embodiments, suitable reactions or processes can comprise one or more of a sample preparation process, a washing process, a sample purification process, a pre-amplification process, a pre-amplified product purification process, an amplification process, an amplified product purification process, a separation process, a sequencing process, a sequencing product purification process, a labeling process, a detecting process, or the like. Processing components can comprise sample preparation components, purification components, pre-amplification reaction components, amplification reaction components, sequencing reaction components, or the like. The skilled artisan can readily select and employ suitable components for a desired reaction or process, without undue experimentation.

According to some embodiments, processing or reaction components can be disposed in one or more retainment regions, channels, or fluid processing passageways, using any methods known in the art. For example, components can be sprayed and dried, delivered using a diluent, injected using a capillary, a pipette, and/or a robotic pipette, or otherwise disposed in the regions or fluid processing passageways.

According to various embodiments, a fluid processing device is provided that can comprise one or more fluid processing passageways that can comprise one or more elements, for example, one or more of a channel, a branch channel, a valve, a flow splitter, a vent, a port, an access area, a via, a bead, a reagent containing bead, a cover layer, a reaction component, any combination thereof, and the like. Any element can be in fluid communication with another element.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve disposed in the fluid processing passageway.

The term "in fluid communication" refers to in direct fluid communication and/or capable of direct fluid communication, unless otherwise expressly stated. The term "in valved fluid communication" refers to elements wherein a valve is disposed between the elements, such that upon opening or actuating the valve, fluid communication between the elements is established.

According to some embodiments, the term "capillary flow" means passive flow resulting from a capillary potential gradient or a surface potential gradient, created during device fabrication that can direct the flow of liquid via capillary effect (surface tension).

According to some embodiments a fluid processing device is provided. The device can comprise a substrate that can comprise, for example, a top or a first surface, and one or more fluid processing passageways that can be provided in communication with and/or can be defined by, for example, at least a portion of the top or first surface of the substrate. The one or more fluid processing passageways can be provided, for example, in a top or first surface of a substrate, on a top or first surface of a substrate, in a substrate, in a bottom or second surface of a substrate, on a bottom or second surface of a substrate, in an edge of a substrate, on an edge of a substrate, or any combination thereof. A fluid processing device can comprise different levels and layers of fluid processing passageways that can comprise, for example, different levels and layers of channels and regions. For example, a tiered, multichannel device can comprise one or more fluid processing passageways that traverse different heights or levels in the substrate.

Throughout the application, descriptions of various embodiments use "comprising" language; however, it will be understood by one of skill in the art, that in some specific instances, an embodiment can alternatively be described using the language "consisting essentially of" or "consisting of"

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. In some instances, "about" can be understood to mean a given value ±5%. Therefore, for example, about 100 nl, could mean 95-105 nl. At the very least, each numerical parameter should at least be construed in light of the number of reported significant digits and by applying ordinary rounding techniques.

A user can operate the diagnostic device by injecting a sample into the sample retainment region, prior to, at the same time as, or subsequent to pushing a button or otherwise applying pressure to the retainment regions that contain unreacted reagents. For example, a user can inject a sample and then push a button or other feature or area of the device. As an example of an assay performed with a device according to various embodiments, a typical ligation assay for detection of oligo-nucleotides can include constituents comprising the sample, a ligation oligomer, ligation reagent which can be a mixture of enzyme and buffer, a wash buffer, and extension and detection reagents. The sample, the ligation oligomer, and the ligation reagent can be allowed to mix and react along with wash buffers and the extension and detection reagents in an automatically controlled process. The process can occur after a user has injected the sample into the sample retainment region and has released the reagents from the unreacted reagent retainment regions by applying pressure to those retainment regions.

According to various embodiments, a diagnostic device can be provided that uses capillary driven flow for fluid actuation. The flow cross-section of the fluid processing passageways interconnecting the various retainment regions can contribute to the rate at which the reagents and sample are mixed in the reaction retainment region. Valves placed within the flow control fluid processing passageways interconnecting the retainment regions can provide automatic flow control and timing of the fluid actuation.

According to various embodiments, a fluid flow modulator, as exemplified below with reference to a valve in a flow control passageway interconnecting retainment regions, can comprise a material that dissolves when brought into contact with a fluid having desired characteristics. Herein, the phrase "size-changing valve" will be used interchangeably with the phrase "solute bridge valve." The solute bridge valve can automatically control flow through the fluid processing passageway interconnecting the retainment regions and control the timing of fluid actuation by exploiting the time it takes to dissolve, melt, otherwise wash-away or reduce the volume, or swell or increase the volume, of the material making-up the solute bridge valve.

According to various embodiments, a fluid processing device comprises a flow passageway, a plurality of retainment regions, at least two of the retainment regions each being in fluid communication with the flow passageway, and a fluid flow modulator arranged in the flow passageway. The fluid flow modulator can be adapted to form, or modify the size of, a fluid communication between the at least two retainment regions. The fluid flow modulator can comprise a polysaccharide, for example, a water-soluble polysaccharide. The fluid flow modulator can comprise a valve that blocks fluid flow through the flow passageway. The fluid flow modulator can be adapted to open, or to increase the size of, the fluid communication between the at least two retainment regions. The fluid flow modulator is adapted to close, or to decrease the size of, the fluid communication between the at least two retainment regions.

According to various embodiments, the term "fluid" means a gas, an aqueous fluid, a non-aqueous fluid, a vacuum, or a partial vacuum. A gas can comprise, for example, air. Where two retainment regions are separated by a fluid flow modulator, one retainment region can comprise, for example, an aqueous or non-aqueous fluid retained therein, while the other retainment region can comprise a gas, or a vacuum or partial vacuum, contained therein. In various embodiments, the device can be manufactured to provide a vacuum on one or more sides of a dissolvable valve, for example, to achieve a pressure of from about 0.01 atmospheres (atm) to about 0.99 atm, or from about 0.1 atm to about 0.5 atm.

According to various embodiments, at least one of the plurality of retainment regions can comprise an aqueous fluid retained therein. The aqueous fluid can have a pH of about 9.5 or lower. The aqueous fluid can have a pH of about 6.5 or lower.

According to various embodiments, in the fluid processing device, the fluid flow modulator can comprise a water-soluble cellulose derivative. The fluid flow modulator can comprise poly(D-glucosamine), a derivative of poly(D-glucosamine), or a combination thereof. Poly(D-glucosamine) is the chemical name of "chitosan" which is a common name arising from its original source, i.e., chitin from shellfish. The terms "poly (D-glucosamine)" and "chitosan" are used synonymously herein. The fluid flow modulator can comprise poly(D-glucosamine) derivatized with poly(ethylene glycol). The fluid flow modulator can comprise a graft polymer of poly(D-glucosamine) and poly(methoxy polyethyleneglycol(meth) acrylate). The fluid flow modulator can comprise a graft polymer of poly(D-glucosamine) and poly(methoxy polyethyleneglycol (meth)acrylamide). The fluid flow modulator can comprise poly(D-glucosamine) substituted with hydrophilic groups. According to various embodiments, the fluid flow modulator can comprise at least one of N-[(2-hydroxy-3-trimethylammonium)propyl]poly(D-glucosamine), N,O-carboxyalkyl poly(D-glucosamine), N-ethoxylated poly(D-glucosamine), and N-benzylsulfonated poly(D-glucosamine). The fluid flow modulator can comprise an N-substituted poly(D-glucosamine) derived from a reductive alkylation of at least one of an aldehydro sugar and a keto sugar.

According to various embodiments, the fluid flow modulator can comprise an N-substituted poly(D-glucosamine) derived from a reductive alkylation of at least one of D-glucose, N-acetylglucosamine, D-glucosamine, D-galactose, D-galactosamine, D-fructose, D-glucoheptonic acid gamma-lactone, lactose, cellobiose, maltose, melibiose, maltotriose, streptomycin sulfate, C6-aldehydro-cycloheptaamylose, dextran, and combinations thereof.

According to various embodiments, the fluid flow modulator can comprise at least one of methylcellulose, hydroxymethyl cellulose, ethylcellulose, hydroxypropyl methylcellulose, quartemized hydroxyethylcellulose ethoxylate, (2-hydroxyethyl)-beta-cyclodextrin, carboxymethylcellulose, a sodium salt of carboxymethylcellulose, a potassium salt of carboxymethylcellulose, m-aminobenzyloxymethyl cellulose, cyanoethylated cellulose, diethylaminoethyl cellulose, and diethyl-(2-hydroxypropyl)aminoethyl cellulose.

According to various embodiments, the fluid processing device further comprises a liquid retained in at least one additional retainment region. The liquid retained in the at least one additional retainment region can have a pH of about 9.5 or lower. The liquid retained in the at least one additional retainment region can have a pH of about 6.5 or lower.

According to various embodiments, the fluid processing device comprises a flow passageway dimensioned so that a flow of fluid from at least one of two or more retainment regions and through the flow passageway, can occur by capillary action. One or more maximum dimensions of about 5 mm or less, for example, about 2 mm or less, or about 1 mm or less.

According to various embodiments, the fluid processing device comprises a flow passageway dimensioned so that a migration of charged components in a fluid, from at least one of the retainment regions through the flow passageway, is capable of migration by electrokinetic action. One or more maximum dimensions of about 5 millimeter or less, for example, about 2 millimeters or less, or about 1 millimeter or less.

According to various embodiments, the fluid processing device can comprise at least two electrodes disposed in the device with a flow passageway therebetween. A system can be provided that includes electrical leads that can be electrically connected to the electrodes.

According to various embodiments, the fluid processing device can further comprise at least one additional retainment region, at least one additional flow passageway, and at least one pressure-actuatable valve arranged in the at least one additional flow passageway. The additional flow passageway can be in fluid communication with the additional retainment region and one or more other retainment regions. The pressure-actuatable valve can comprise a frangible diaphragm. The frangible diaphragm can comprise a material that is insoluble in water at room temperature. The pressure-actuatable valve can comprise a burstable valve that is adapted to open and establish fluid communication only upon receiving pressure of at least about 0.1 psig, for example, at least about 0.5 psig, at least about 1 psig, or at least about 3 psig from a fluid in at least one additional retainment region. The device can comprise a liquid retained in at least one additional retainment region.

According to various embodiments, the fluid processing device can comprise at least one heat-actuatable valve arranged in at least one additional flow passageway. The at least one additional flow passageway can be in fluid communication with at least one additional retainment region and at least one of the plurality of retainment regions. The heat-actuatable valve can comprise at least one material selected from a rubber, a plastic, a wax, a paraffin, a polyethylene glycol material, a derivative of a polyethylene glycol material, a polysaccharide, a derivative of polysaccharide, and combinations thereof. The heat-actuatable valve can comprise a material that is insoluble in water at room temperature. The heat-actuatable valve can comprise a material that has a melting point of from about 35° C. to about 95° C., for example, from about 35° C. to about 70° C., from about 35° C. to about 65° C., or from about 35° C. to about 50° C.

According to various embodiments, the fluid processing device further comprises a liquid retained in the at least one additional retainment region.

According to various embodiments, the fluid processing device can comprise a liquid retained in at least one retainment region. The fluid processing device can comprise a first reagent for a reaction, retained in at least a first one of the plurality of retainment regions. The fluid processing device can comprise a second reagent for the reaction retained in at least a second one of the plurality of retainment regions. The second reagent can be the same as, or can differ from, the first reagent. According to various embodiments, the fluid processing device further comprises a plurality of flow passageways.

According to various embodiments, the fluid processing device can comprise a plurality of fluid flow modulators, wherein each fluid flow modulator can comprise a polysaccharide or a derivative of a polysaccharide. Each fluid flow modulator can be adapted to dissolve when contacted with an aqueous solution at room temperature and having a pH of 9.5 or lower. Each fluid flow modulator can be adapted to dissolve when contacted with an aqueous solution at room temperature and having a pH of 6.5 or lower.

According to various embodiments, the fluid processing device can comprise a flow passageway, and a valve arranged in the flow passageway, being adapted to open to form a fluid communication through the flow passageway. The valve can be adapted to dissolve when contacted with aqueous solution at room temperature and having a pH of 9.5 or lower, for example, 6.5 or lower. The valve can comprise poly(D-glucosamine), a derivative of poly(D-glucosamine), or a combination thereof. The valve can comprise poly(D-glucosamine) derivatized with poly(ethylene glycol).

According to various embodiments, a system can comprise the fluid processing device, a power source, and at least two electrical leads forming electrical connections, respectively, between the power source and the at least two electrodes. The system can comprise the fluid processing device and a pump, wherein the pump is arranged in fluid communication with at least one of the flow passageway and one or more of the plurality of retainment regions. The system can comprise the fluid processing device and a magnet, wherein the magnet generates a magnetic field and said fluid processing device is arranged at least partially within said magnetic field.

According to various embodiments, instead of or in addition to a fluid flow modulator, a barrier can be provided that at least partially separates a first retainment region from a second retainment region. The barrier can comprise a polysaccharide or a derivative of a polysaccharide. The barrier can comprise any of the polysaccharide or polysaccharide derivatives described above that can be used for the fluid flow modulator.

According to various embodiments, the barrier can have any of a variety of shapes. For example, the barrier can comprise an outer wall having the shape of a polygon or a ring-shape.

The barriers, flow modulators, and valves described herein can have the shapes, sizes, components, chemicals, and other properties described with reference to the barriers, flow modulators, and valves described in U.S. Provisional Patent Application No. 60/619,677, to Banerjee et al., in U.S. Provisional Patent Application No. 60/619,731, to Banerjee et al., and in U.S. Provisional Patent Application No. 60/619,623, to Faulstich et al., all filed on Oct. 18, 2004, and all of which are incorporated herein in their entireties by reference.

According to various embodiments, a method is provided that comprises providing a fluid processing device comprising at least a first retainment region and a second retainment region, and a barrier arranged at least partially between the first retainment region and the second retainment region. The barrier comprises a polysaccharide or a derivative of a polysaccharide, and the method can comprise contacting the barrier with a solvent, such as an aqueous solution, suspension, mixture, or other material, to change the shape of the barrier. Contacting the barrier with the solvent can form, or change the size of, a fluid communication between the first retainment region and the second retainment region. Contacting the barrier with the solvent can open, or increase the size of, a fluid communication between the first retainment region and the second retainment region. Contacting the barrier with the solvent can close, or decrease the size of, a fluid communication between the first retainment region and the second retainment region.

According to various embodiments, a method is provided that comprises processing a fluid processing device that comprises at least a first retainment region and a second retainment region, and a barrier arranged between them. At least one of the first and second retainment regions retains an aqueous solution. The barrier can comprise at least one of a chitosan material, a chitosan derivative material, and a combination thereof. The barrier is adapted to swell or dissolve when contacted with the aqueous solution. According to various embodiments, the method includes contacting the barrier with the aqueous solution to dissolve at least a portion of the barrier and form, or increase the size of, a fluid communication between the first retainment region and the second retainment region. The fluid processing device can comprise at least one additional retainment region, at least one flow passageway, and at least one pressure-actuatable valve arranged in the at least one flow passageway. The at least one flow passageway can be in fluid communication with the at least one additional retainment region and at least one of the first retainment region and the second retainment region. The method can comprise opening the pressure-actuatable valve. The pressure-actuatable valve can comprise a diaphragm and the method can comprise bursting the diaphragm by applying pressure to the diaphragm. A heat-actuatable valve can be actuated instead of, or in addition to, actuation of a pressure-actuatable valve.

According to various embodiments, the method can comprise migrating charged components in a sample from at least one of the at least two retainment regions, through the flow passageway, by electrokinetic motion. Migration of the charged components can be accomplished by creating an electric field in the device. A system can be provided that includes an electric field generator.

According to various embodiments, a method can comprise creating a pressure differential between a first retainment region and a second retainment region, and moving, with the pressure differential, a fluid from one of the first retainment region and the second retainment region into the other of the first retainment region and the second retainment region. The pressure differential can be generated by activating a pump. The pressure differential can comprise a positive-pressure differential or negative-pressure differential. A positive pressure means a pressure at or greater than atmospheric pressure, i.e., 1 atm. A negative pressure means a pressure less than atmospheric pressure, i.e. less than 1 atm.

According to various embodiments, the method can comprise creating a magnetic field across a first retainment region and a second retainment region, and moving, with the magnetic field, magnetically attractable materials from one of the retainment regions toward the other retainment region.

According to various embodiments, the method can comprise performing a set of predetermined assays in a plurality of retainment regions, for example, retainment regions, in a closed, disposable device. An exemplary device is a cuvette. The retainment regions can be interconnected by fluid processing passageways but closed to fluid flow to or from locations outside of the cuvette. The first retainment regions can be selectively closed-off from fluid communication with second retainment regions through first channels that interconnect them. Selective closing-off can be provided by pressure-actuated valves positioned in the first channels. The second retainment regions can be interconnected to third retainment regions by second channels. Flow through the second channels can be controlled by fluid flow modulators positioned in the second channels, which can also provide selective closing-off. The method can comprise applying pressure to a pressure-actuated valve in a first channel sufficient to break the valve and provide fluid communication between the first and second retainment regions. Such a method can be used to introduce a sample for testing or other processing into one or more third retainment regions and/or establishing fluid communication between the second retainment regions and one or more third retainment regions, at a controlled rate. The controlled rate can be a function of characteristics of at least one of, a fluid in a third retainment region and a fluid within the second retainment regions.

According to various embodiments, a system is provided that comprises a fluid processing device as described herein, and a pump, wherein the pump is arranged in fluid communication with at least one of a flow passageway and one or more retainment regions.

A system can be provided that comprises a fluid processing device as described herein, a power source, and at least two electrical leads forming electrical connections, respectively, between the power source and the at least two electrodes. A system can be provided that comprises a fluid processing device as described herein, and a magnet, wherein the magnet generates a magnetic field and the fluid processing device is arranged at least partially within the magnetic field.

Exemplary devices and methods according to various embodiments are described below with reference to the drawings. The present teachings are not limited to the embodiments depicted in the drawings.

Figure 1A:
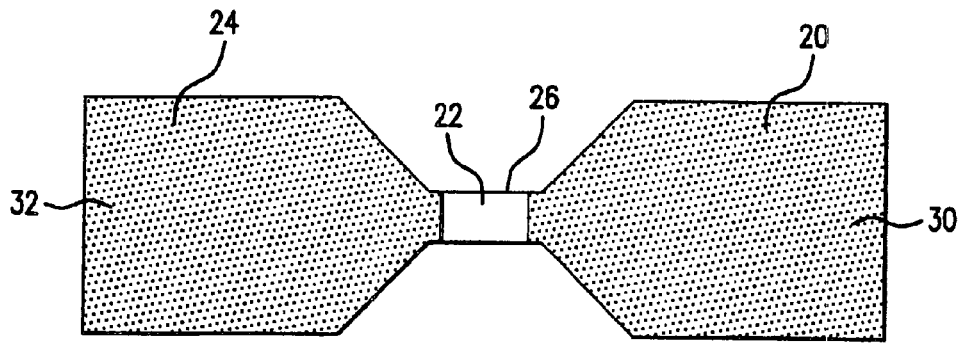
Figure 1B:
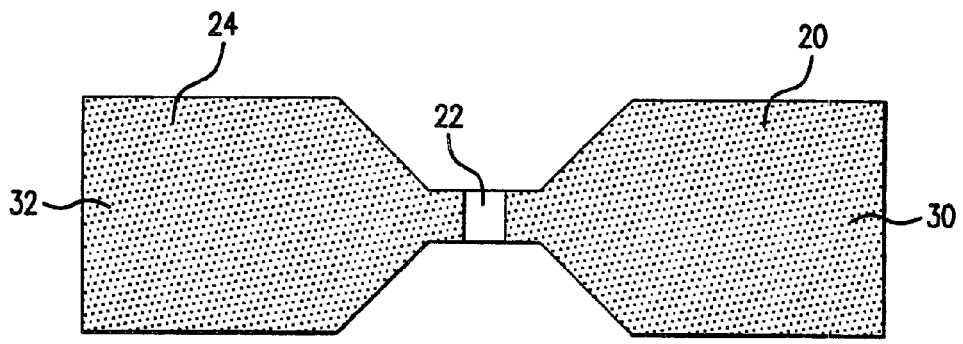
Figure 1C:
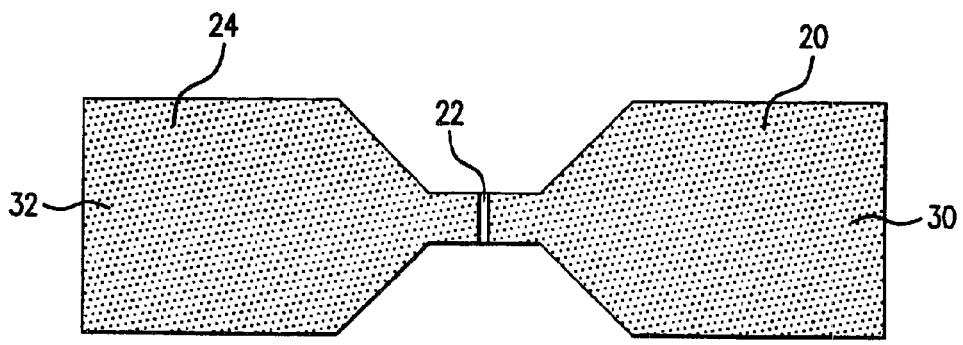

Referring to FIGS. 1(a)-1(c), a schematic illustration of the process by which a solute bridge valve establishes fluid communication between two passageways, according to various embodiments, is shown. FIG. 1(a) shows two retainment regions 20, 24 containing fluids 30, 32, respectively, with the two retainment regions 20, 24 being interconnected through a flow fluid processing passageway 26. A solute bridge valve 22 can consist of a plug of material that completely or partially blocks the flow fluid processing passageway 26 and separates the fluids 30 and 32, e.g. air, a gas, solvents, reagents, a vacuum or partial vacuum, or other materials, in the respective retainment regions 20, 24. In some embodiments, one or both of fluids 30 or 32, can, at least initially, comprise a gas, a vacuum, a partial vacuum, and/or a pressurized fluid.

FIG. 1(b) shows the size of the solute bridge valve 22 decreasing as the polysaccharide material that makes up the solute bridge valve gradually dissolves into one or both of the fluids 30, 32 in retainment regions 20, 24. FIG. 1(c) shows that the fluids 30, 32 have come into contact with each other when the material making up solute bridge valve 22 has completely dissolved. The time required to completely dissolve the solute bridge valve 22 can be determined by the cross-sectional area and/or shape of the capillary flow passage 26 and the length and dissolvability of the solute bridge valve 22. By controlling the material and/or size of the solute bridge valve 22, it is also possible to control the length of the time elapsed before the solute bridge valve has completely dissolved to allow mixing of the fluids 30, 32.

It is desirable for the material that makes up the valve 22 to be a material that is compatible with the assay, and would not adversely affect the assay condition. One example of a material that could be used to make up the valve 22 is a polysaccharide or a polysaccharide derivative, for example, a water-soluble polysaccharide. An exemplary polysaccharide is poly (D-glucosamine) or chitosan. Chitosan can be highly responsive, with a film of chitosan varying in thickness in response to a pH change, by a factor of 3. The source material for chitosan (chitin) is extremely abundant in nature which makes it inexpensive. The chitosan valve can also be manufactured by electrodeposition or by electrostatic atomization or electrospray ionization deposition. The geometry of a fluid flow modulator or valve produced using an electric technique can be controlled by the shape of a metallic electrode used and the process time. Chitosan is quite inert and does not affect biological assays in general.

Chitosan can also be used for the feature that it will disassociate into ionic components under acidic pH conditions, spontaneously dissolving in an acidic solution up to pH of 9.5. The pH of a dissolving solvent can be tailored to affect the rate of dissolution of the chitosan. At more basic conditions, for example, pH greater than 9.5, chitosan does not dissolve.

According to various embodiments, a pH responsive valve can be made from a pH responsive material that partially or completely separates two retainment regions, for example, retainment regions, in a diagnostic device. The pH responsive material can be a material that changes volume, (i.e., shrinks if its volume decreases, or swells if its volume increases) in response to a change in the local pH. Flow control through a fluid processing passageway connecting the two regions can be achieved by the change in the open cross-sectional area of the fluid processing passageway between the two regions, subsequent to the change in volume of the pH-responsive material. The actuation of the valve can consist of the volumetric change of the material resulting from a change in pH or other characteristics of a solution or other material contacting the valve. If the material making up the valve completely blocks the fluid processing passageway, the two regions can be completely separated and the valve can be closed. When the pH of a liquid within a region crosses a certain threshold value pH, to cause shrinking of the pH-responsive material, the cross-sectional area of the respective fluid processing passageway can open, and the valve can be in an open state whereby fluids can flow through the fluid processing passageway. The reverse operation is also possible, that is, by adjusting or providing the pH of the liquid in contact with the valve, the valve can be made to swell and change from an open state to a closed state.

Several materials can be used to perform the above-described function according to various embodiments. Chitosan is particularly amendable to microfluidic applications, including bio-microfluidic applications, as a result of several beneficial characteristics. Chitosan can have a high responsiveness to variations in pH, with a film of chitosan varying in thickness in response to a change in pH by a factor of three. A valve made from a material such as chitosan that can change volume in response to a change in pH can also be an extremely simple valve that does not require moving parts and that has a high level reliability. Furthermore, because the actuation of the valve can occur as a result in a local change in pH, no external energy sources are required. The source material used in preparing chitosan, is extremely abundant in nature and therefore is inexpensive.

According to various embodiments, beside pH, a change in volume of the material can result from other characteristics of the solution or solutions, such as temperature, water content, chemical composition, electrical charge, magnetic properties, or the like. If the material making up the valve completely blocks the fluid processing passageway, the two regions can be completely separated.

FIG. 2 shows an embodiment of an assay device that uses capillary driven flow and solute bridge valves to control a specific sequence of fluid actuation steps. The device shown in FIG. 2 can be constructed as a microfluidic chip manufactured using microfabrication techniques. According to various embodiments, the chip can comprise a set of retainment regions and microchannels for housing different liquids such as reagents, samples, etc., and for mixing and reacting the various liquids. FIG. 2 shows a device according to various embodiments having a sample retainment region 90 connected through a fluid processing passageway 80 to a reaction retainment region 48. An intermediate retainment region or retainment regions is/are connected through a fluid processing passageway 170 containing a valve 70 to the reaction retainment region 48, and a second intermediate retainment region 46 is connected through a fluid flow passage 172 containing a valve 72 to the reaction retainment region 48. A first reagent retainment region 40 for containing unreacted reagents 120 can be connected through a fluid processing passageway 160 containing a valve 60 to one intermediate retainment region 44, while a second reagent retainment region 42 containing unreacted reagents 124 can be connected through a fluid processing passageway 162 containing a valve 62 to the second intermediate retainment region 46. The reaction retainment region 48 is connected through a fluid processing passageway 174 containing a valve 74 to a first waste retainment region 50, which can also be connected through another fluid processing passageway 176 containing a valve 76 to a second waste retainment region 52.

Reagent retainment regions 40, 42 connected by fluid processing passageways 160, 162 with valves 60, 62 to the intermediate retainment regions 44, 46 can be selectively separated from the intermediate retainment regions 44, 46 by the pressure actuated valves 60, 62 placed within the fluid processing passageways 160, 162. According to various embodiments, the pressure actuated valves 60, 62 within fluid processing passageways 160, 162 can be diaphragms that are burstable upon pressure being applied to the reagent retainment regions 40, 42.

The intermediate retainment regions 44, 46 can be in turn connected through the fluid processing passageways 170, 172 containing valves 70, 72 to the reaction retainment region 48. Fluid communication through the fluid processing passageways 170, 172 containing valves 70, 72 can be controlled by the fluid flow cross-sectional area of the passages 170, 172 as well as the positioning of solute bridge valves 70, 72 as discussed above, within the fluid processing passageways 170, 172. The solute bridge valves 70, 72 contained within the fluid processing passageways 170, 172 can provide automatic control of the fluid communication between the intermediate retainment regions 44, 46 and the reaction retainment region 48 as a result of their responsiveness to stimuli such as the chemical composition of the fluids within retainment regions 44, 46 and within reaction retainment region 48. Each of regions 90, 48, 40, 42, 50, and 52, can optionally comprise a vent 91, 49, 41, 43, 51, and 53, respectively.

FIG. 3 illustrates an embodiment wherein the retainment regions and fluid processing passageways are arranged such that solute bridge valves 70a, 72a, 74a, 76a corresponding to solute bridge valves 70, 72, 74, 76 of the embodiment shown in FIG. 2, are arranged in a line for ease of manufacture. Each of regions 90a, 48a, 40a, 42a, 50a, and 52a, can optionally comprise a vent 91a, 49a, 41a, 43a, 51a, and 53a, respectively.

FIGS. 4A-4J illustrate a sequence of events that can occur during operation of a diagnostic device according to various embodiments, such as exemplified in FIG. 2. Each of regions 90, 48, 40, 42, 50, and 52, can optionally comprise a vent 91, 49, 41, 43, 51, and 53, respectively.

FIGS. 5A-5J illustrate a sequence of events that can occur during operation of a diagnostic device according to various embodiments, such as exemplified in FIG. 3. Each of regions 90a, 48a, 40a, 42a, 50a, and 52a, can optionally comprise a vent 91a, 49a, 41a, 43a, 51a, and 53a, respectively.

Figure 4A:
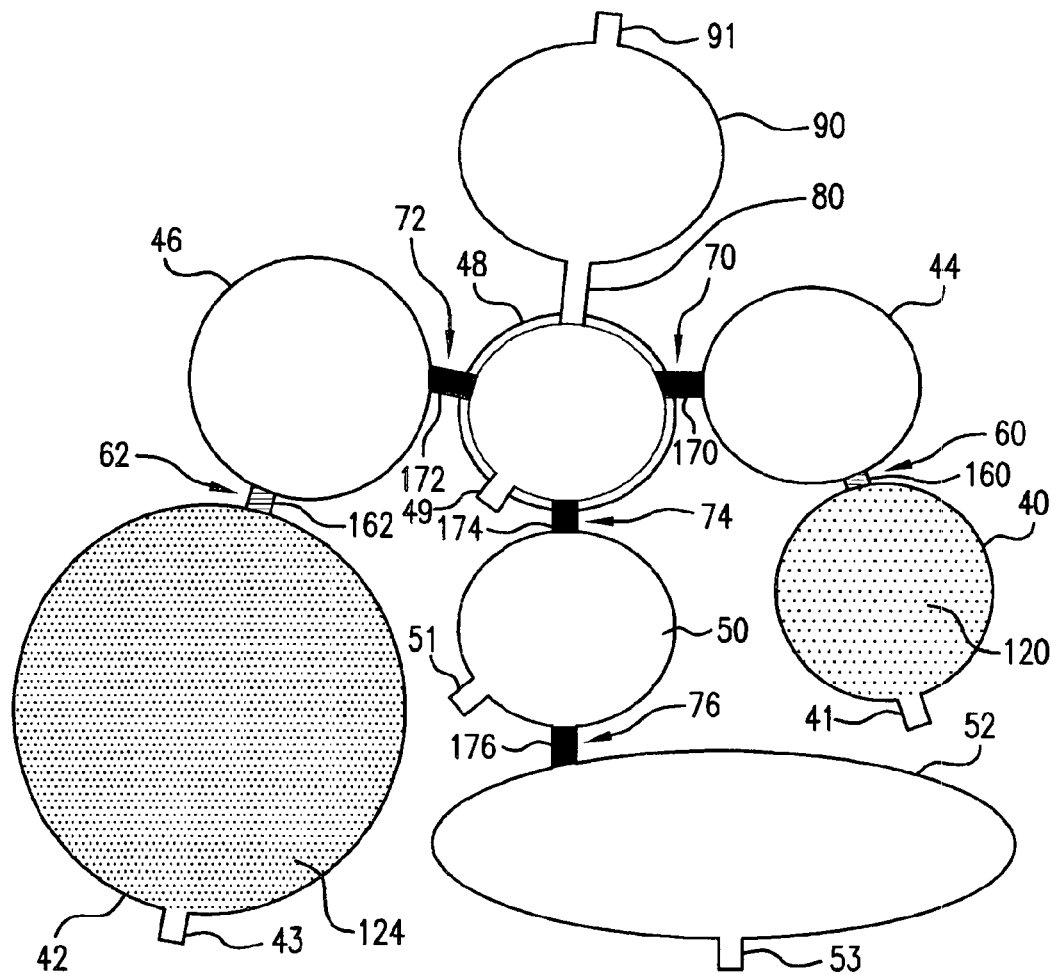

In FIG. 4A a diagnostic device according to various embodiments is provided with retainment regions 40, 42 prefilled with, for example, a wash buffer 124 in retainment region 42 and a detection reagent 120 within retainment region 40. Pressure actuated valves 60, 62, such as burstable or tearable diaphragms, can be provided within the fluid processing passageways 160, 162 separating retainment regions 40, 42 from intermediate retainment regions 44, 46.

Figure 4B:
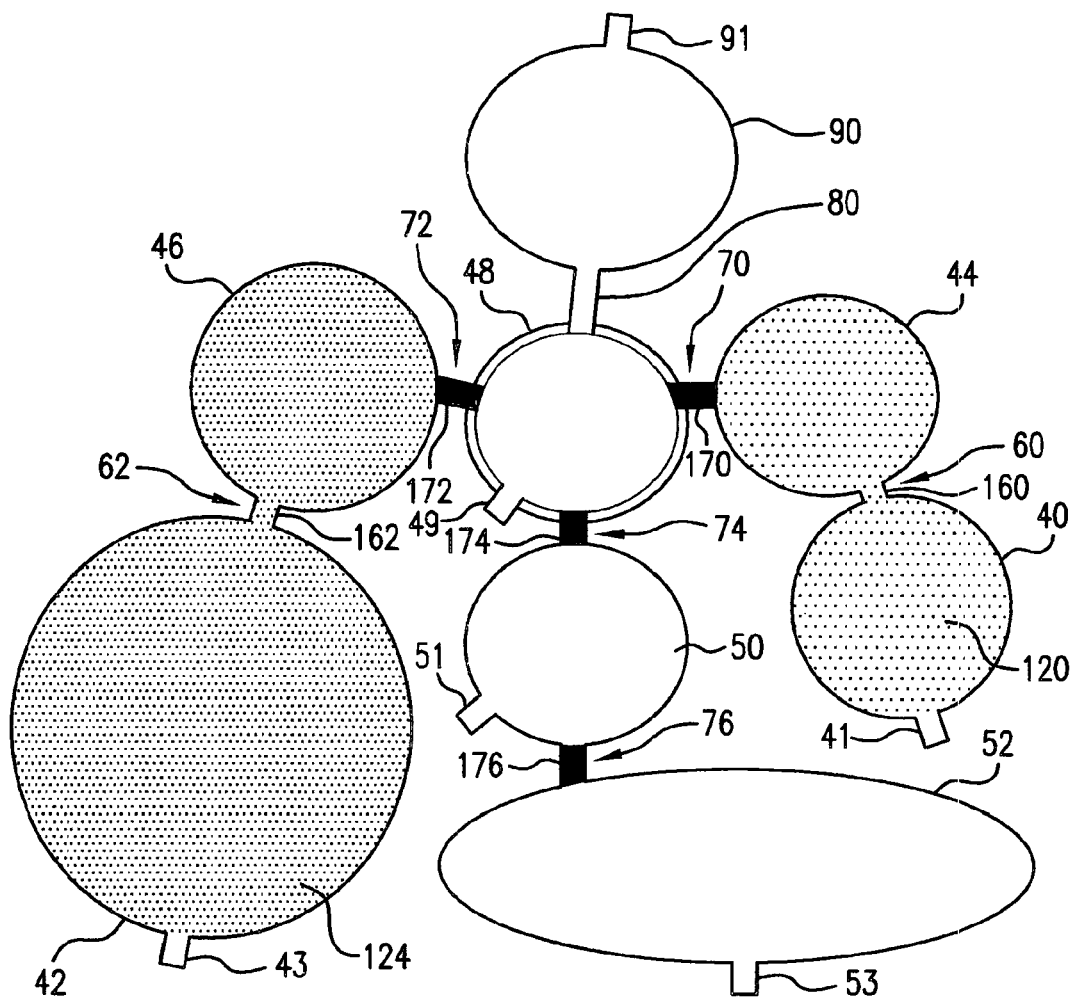

In FIG. 4B a user can apply pressure to the retainment regions 40, 42, thereby actuating or bursting the valves 60, 62 within fluid processing passageways 160, 162 connecting to the intermediate retainment regions 44, 46 and causing flow of the buffers and/or reagents within the retainment regions 40, 42 into intermediate retainment regions 44, 46.

Figure 4C:
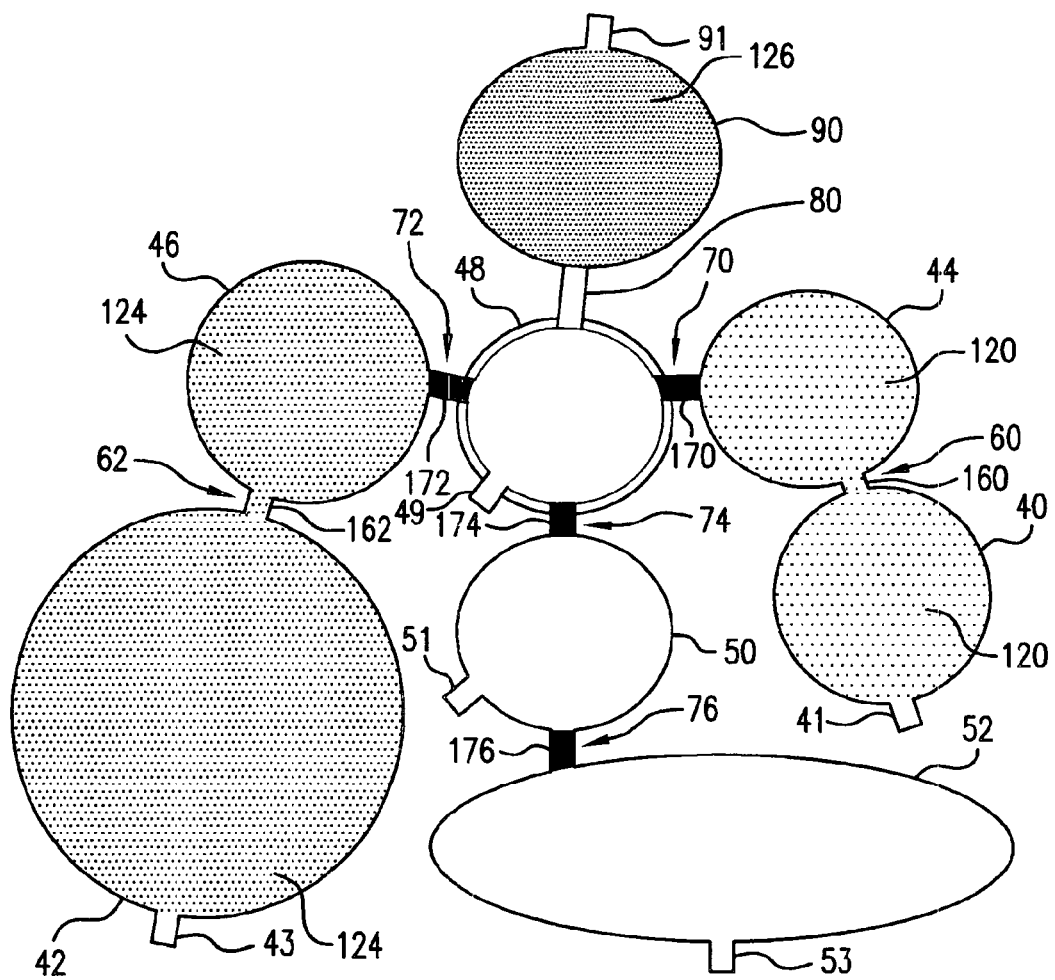

As shown in FIG. 4C a user can inject a sample 126 into the sample retainment region 90, which is connected to the reaction retainment region 48 through a fluid processing passageway 80. fluid processing passageways 170, 172 and 80 can be provided with fluid flow modulators, exemplified below with reference to a valve, and in particular a solute bridge valve, such as a plug of material that can change volume when exposed to certain stimuli. The solute bridge valves can control the fluid communication between intermediate retainment regions 44, 46 and reaction retainment region 48, as well as the fluid communication between the sample retainment region 90 and the reaction retainment region 48. Fluid flow of the sample from sample retainment region 90 into reaction retainment region 48 can also be automatically controlled as a result of the dimensions of the fluid processing passageway 80. The fluid processing passageway 80 can be provided as a capillary passage such that the sample material from sample retainment region 90 gradually wicks into the reaction retainment region 48, without the need for a solute bridge valve to control this flow through fluid processing passageway 80. Pressure can be relieved or equalized via vent 91 and/or 49.

Figure 4D:
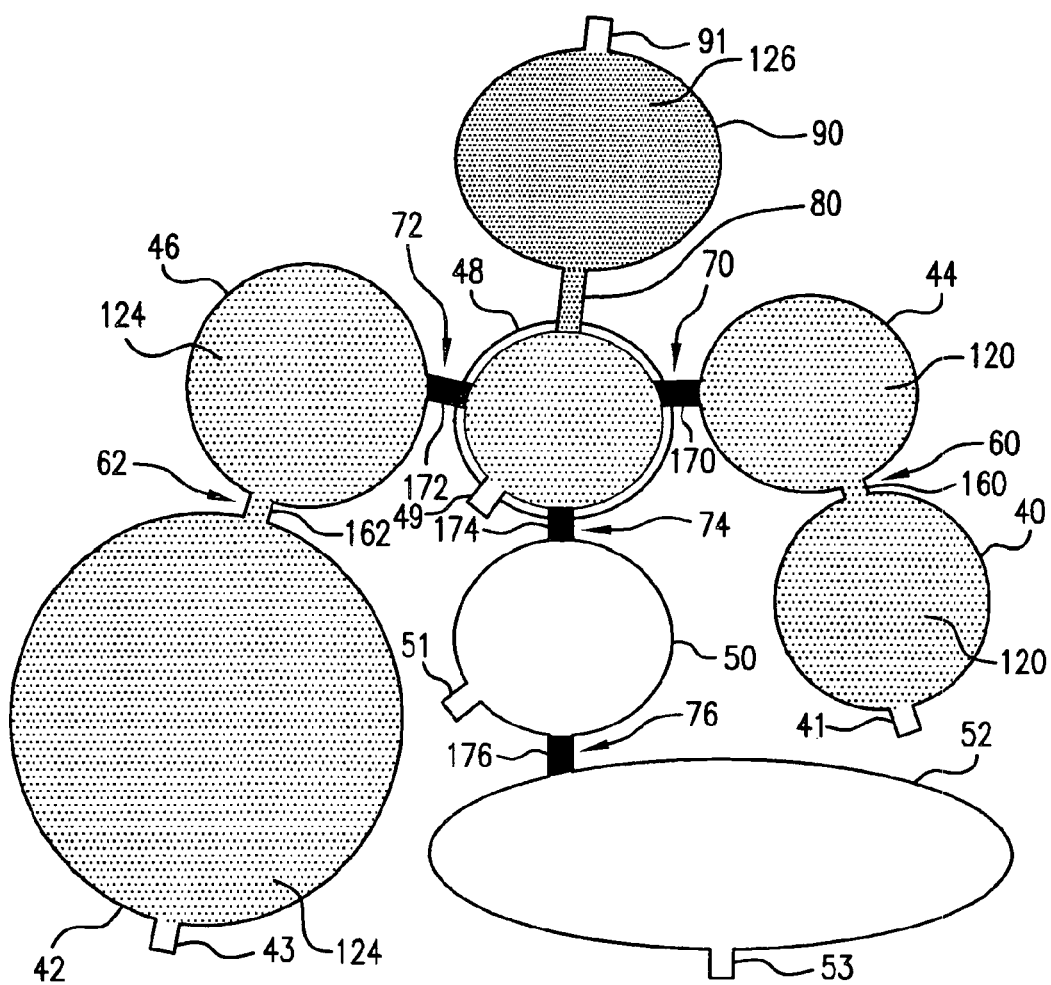
Figure 4E:
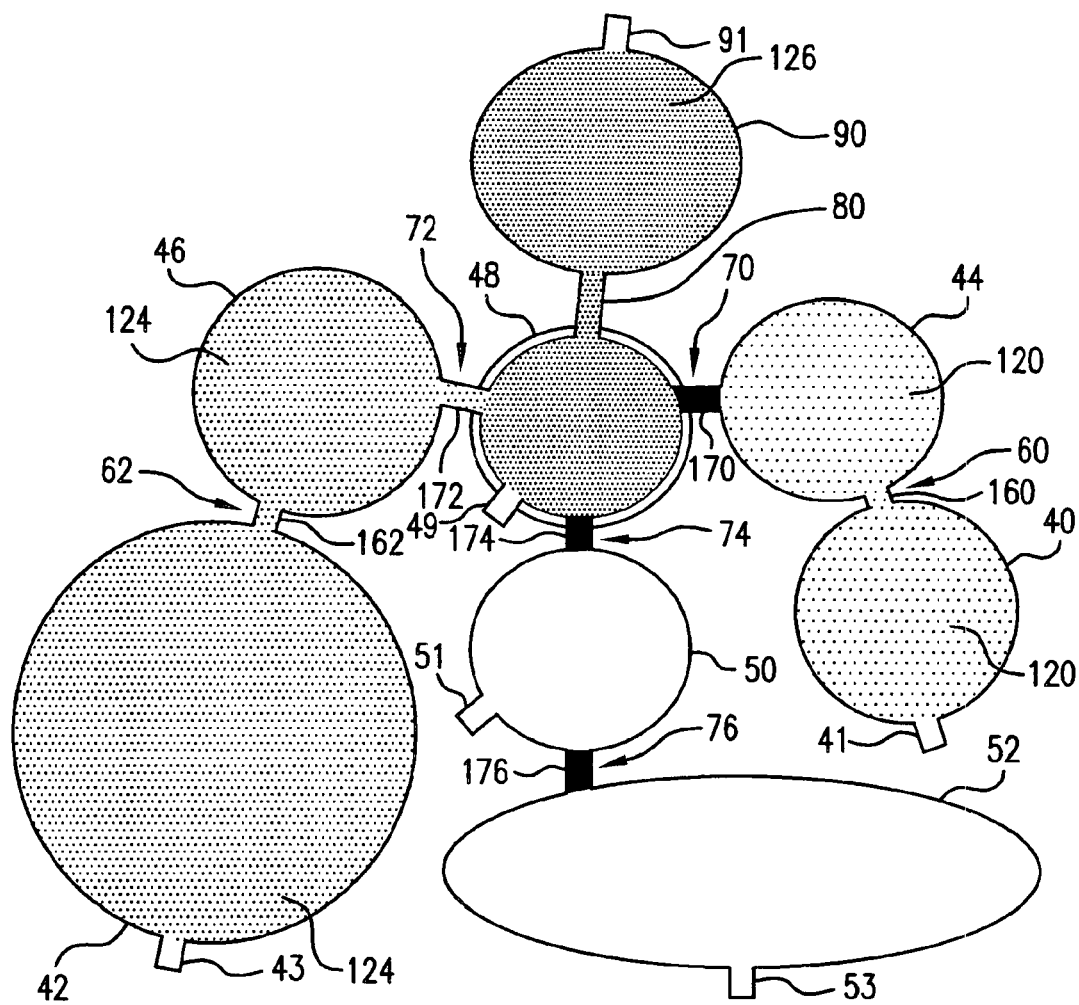

As shown in FIG. 4D, the sample material that is now in reaction retainment region 48 contacts the solute bridge valve 72 on one side of the valve 72 in fluid processing passageway 172, while the reagent in intermediate retainment region 46 contacts the solute bridge valve 72 from the opposite side of the valve. One or more of the reagent in retainment region 46 and/or the sample in reaction retainment region 48 begin to dissolve or otherwise affect the volume of the material making up the solute bridge valve 72. After a certain amount of time that is automatically controlled by the flow cross-section of passage 172 as well as by the volume of material within the solute bridge valve 72, the solute bridge valve 72 in passage 172 allows the reagent in retainment region 46 to gradually diffuse into the sample 126 in reaction retainment region 48, as shown in FIG. 4E. Pressure can be relieved and/or equalized via vent 43.

Figure 4F:
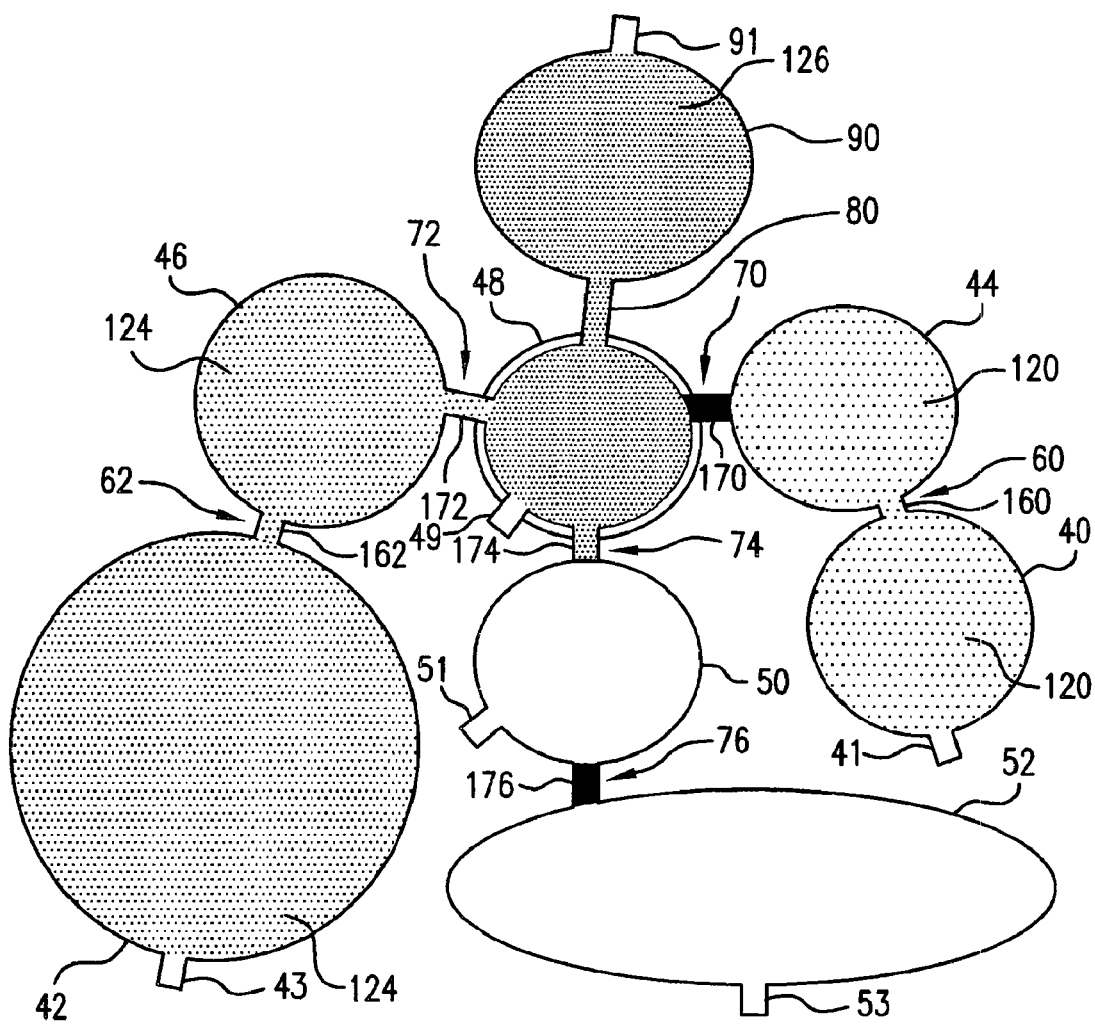
Figure 4G:
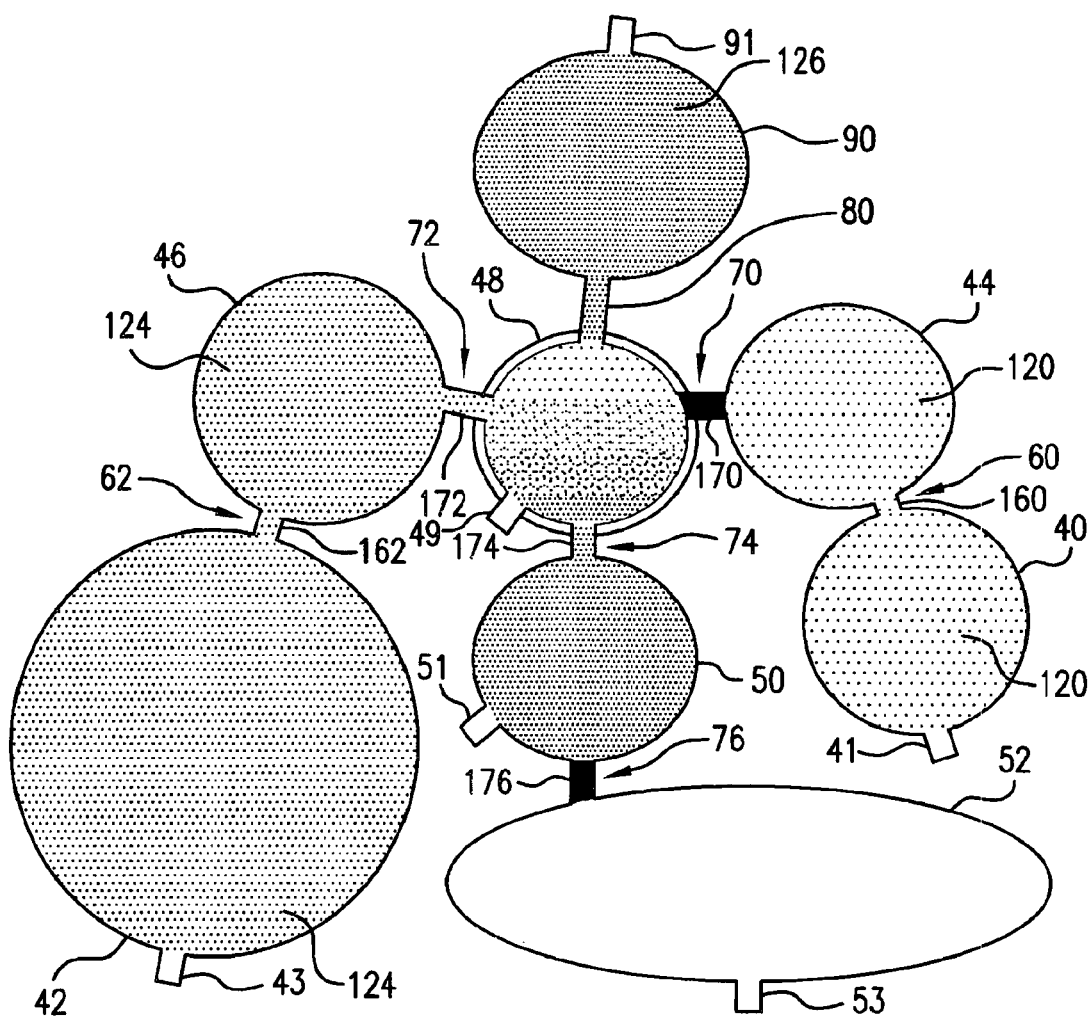

The flow passage 174 leading from the reaction retainment region 48 into a waste retainment region 50 can also be provided with the dimensions that allow for capillary action, and a solute bridge valve 74 that will gradually dissolve or otherwise change volume as a result of contact with the fluid from reaction retainment region 48. As shown in FIG. 4F, the effect of the fluid within reaction retainment region 48 on the solute bridge valve 74 within flow passage 174 gradually opens the flow passage 174 within which the valve 74 is positioned to allow fluid communication between the reaction retainment region 48 and the first waste retainment region 50. The flow of fluid from reaction region 48 into waste region 50 through fluid processing passageway 174 contributes to a capillary flow of more reagent from reagent region 42 through fluid processing passageway 162 and intermediate region 46 into reaction region 48. Pressure resulting from such flow can be relieved via vent 43 and/or vent 49. Flow of fluid from reaction region 48 into waste region 50, as shown in FIG. 4G, can also cause more of sample 126 to flow from sample region 90 into reaction region 48. Pressure resulting from the flow of fluid from reaction region 48 into waste region 50, can be relieved via vent 49 and/or vent 51. According to various embodiments, the relative dimensions of the flow passages such as flow passage 80 leading from sample retainment region 90 into reaction retainment region 48, and the flow passage 172 within which valve 72 is positioned leading from intermediate retainment region 46 into reaction retainment region 48 can be selected in order to contribute to a preferential flow of fluid from the intermediate retainment region 46 into reaction retainment region 48. A smaller flow cross-section through passage 80 than the flow cross-section through passage 172 would result in more fluid flowing from the reagent retainment region 42 and intermediate retainment region 46 into reaction retainment region 48 than the amount of sample flowing from sample retainment region 90 into the reaction retainment region 48.

Figure 4H:
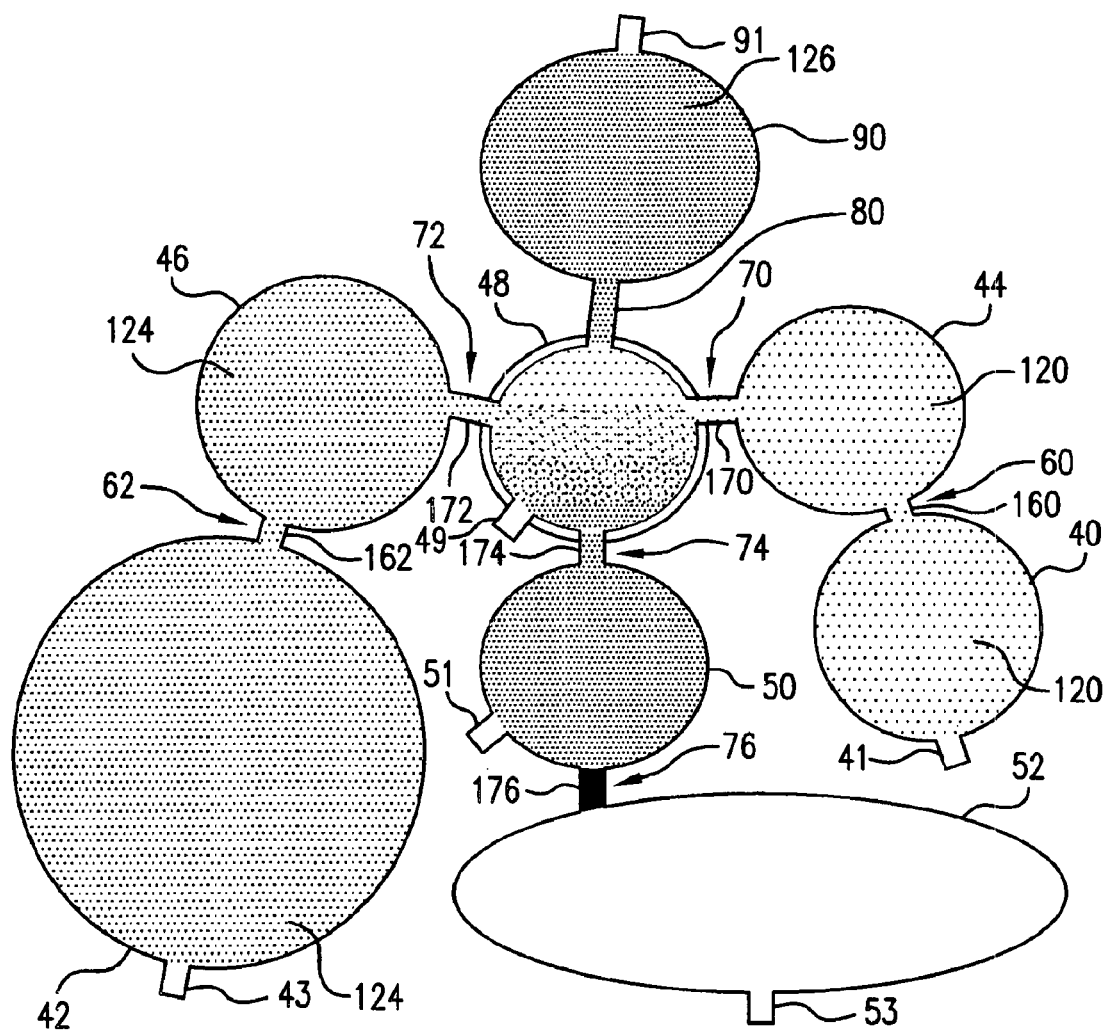

After a predetermined amount of time, solute bridge valve 70 provided in the flow passage 170 between intermediate retainment region 44 and reaction retainment region 48 can also begin to dissolve, melt, or otherwise change in volume such that reagent 120 flows from reagent retainment region 40 through intermediate retainment region 44 and into the reaction retainment region 48, as shown in FIG. 4H. The relative cross-sectional flow areas of the various flow passages connecting retainment regions as well as the amount of material provided in the solute bridge valves within the flow passages can be varied in order to control the amount of time it takes for the reagents and other fluids within the retainment regions to move from one retainment region to the next, thereby providing a control of the fluid handling steps.

Figure 4I:
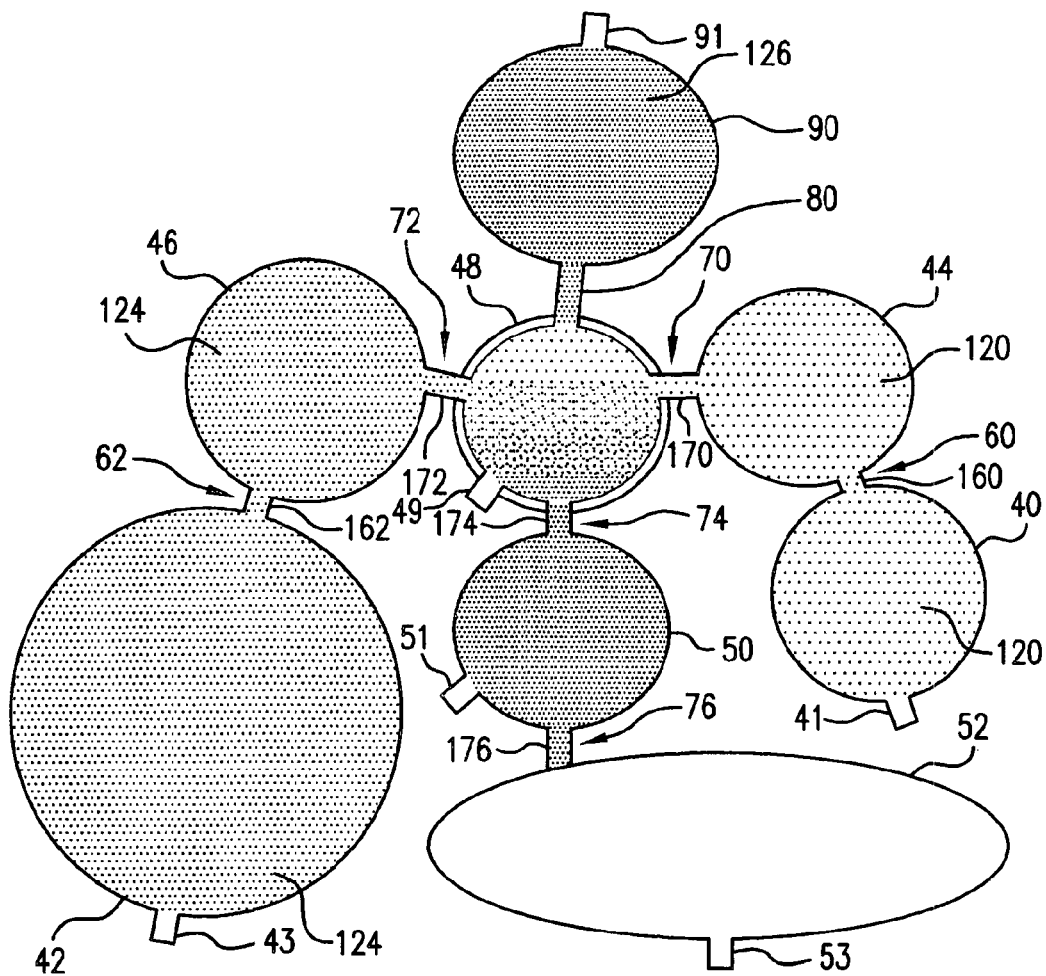
Figure 4J:
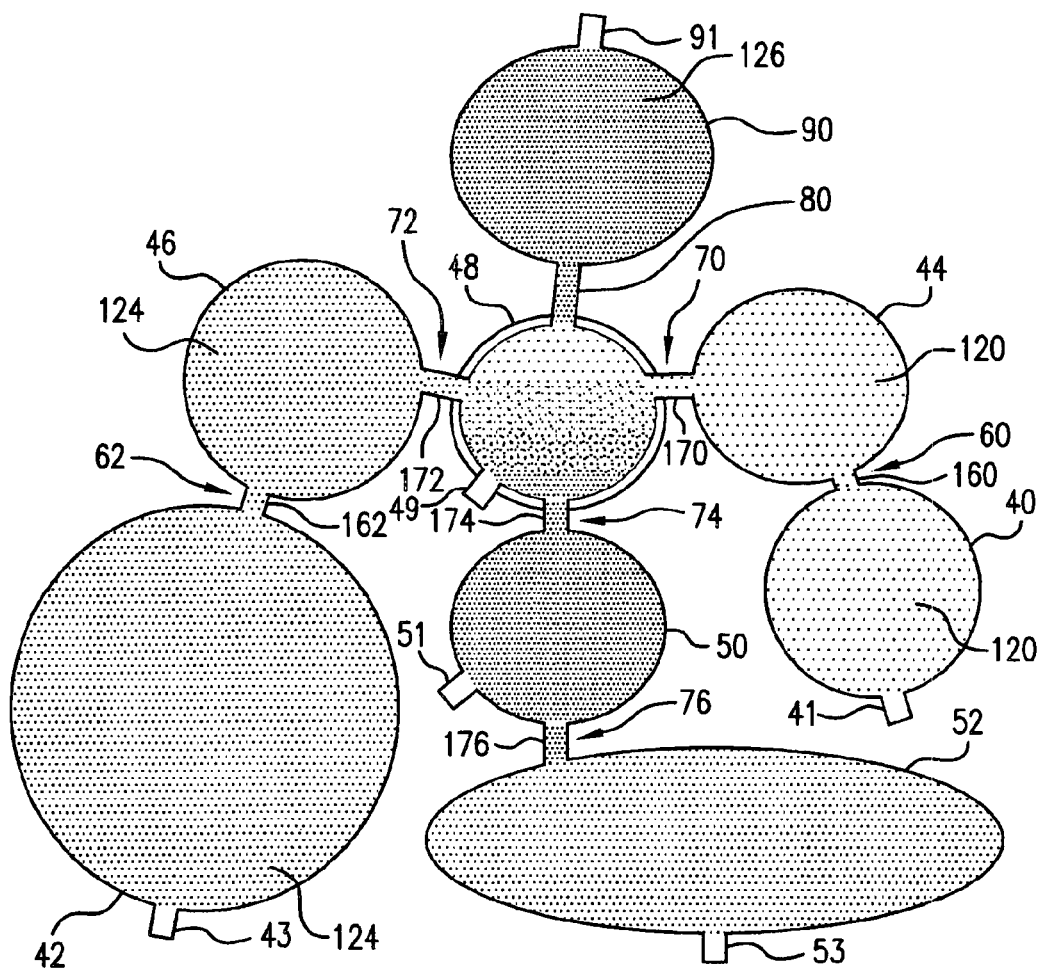

After more time has passed, solute bridge valve 76 in flow passage 176 leading to a second waste retainment region 52 can begin to dissolve, melt, or otherwise change in volume such that fluid can flow from waste retainment region 50 into second waste retainment region 52, as shown in FIGS. 4I and 4J. This flow can cause more of the reagents and sample to flow from regions 44, 46 and 90 into reaction region 48. Pressure can be relieved via vent 49 and/or vent 91.

In an alternative embodiment, as exemplified in FIG. 3 and FIGS. 5A-5J, the diagnostic device can comprise a set of retainment regions and microchannels corresponding to the retainment regions and microchannels of the embodiment exemplified in FIG. 2 and FIGS. 4A-4J, but with the solute bridge valves 72a, 70a, 74a, and 76a being aligned so that they can be formed as a single, extended length of the solute bridge valve material. The process by which mixing of buffer and/or reagent from retainment regions 40a, 42a, and sample from sample retainment region 90a is controlled automatically corresponds with the process described above for the embodiment shown in FIG. 2 and FIGS. 4A-4J.

Figure 5A:
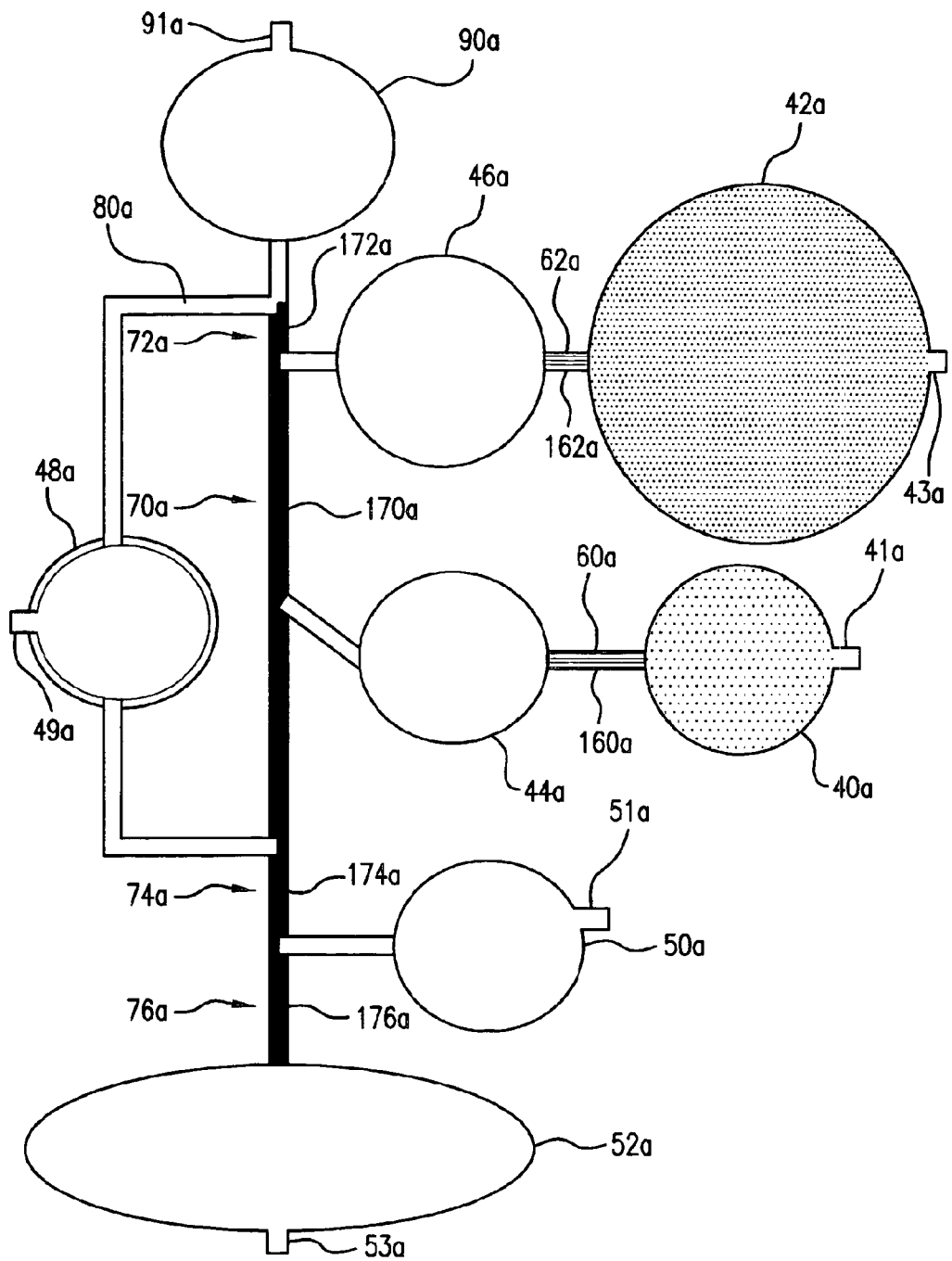
Figure 5B:
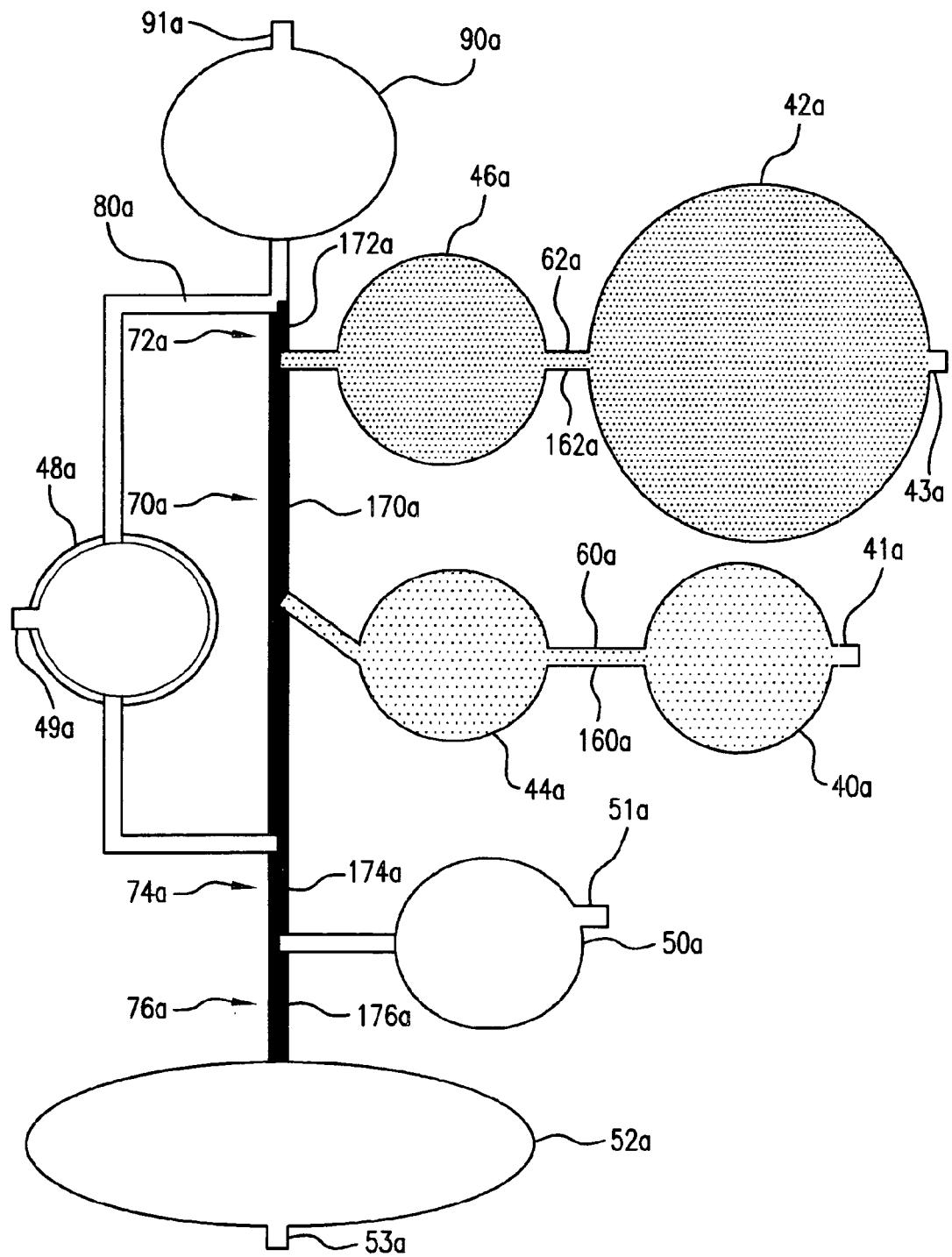
Figure 5C:
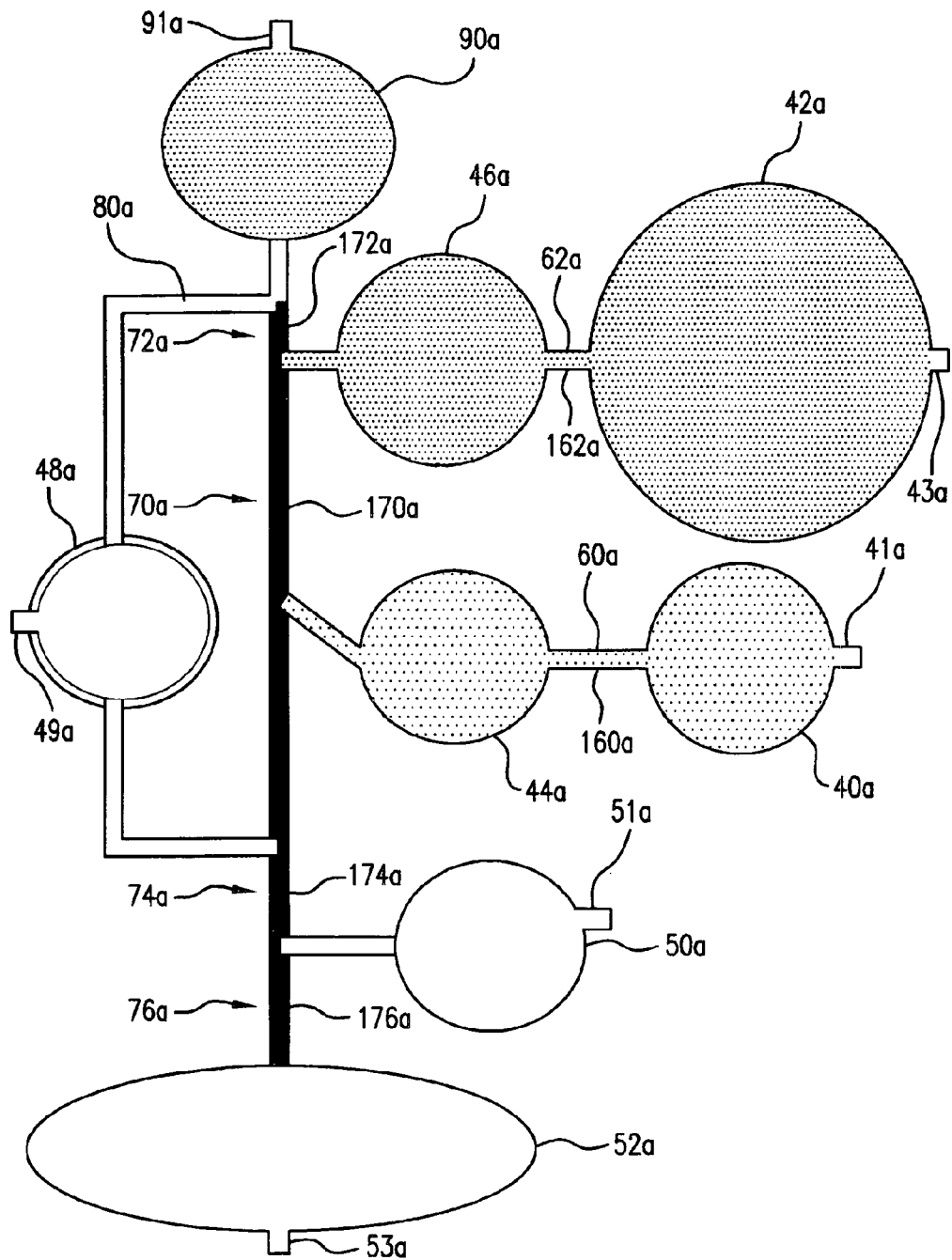
Figure 5D:
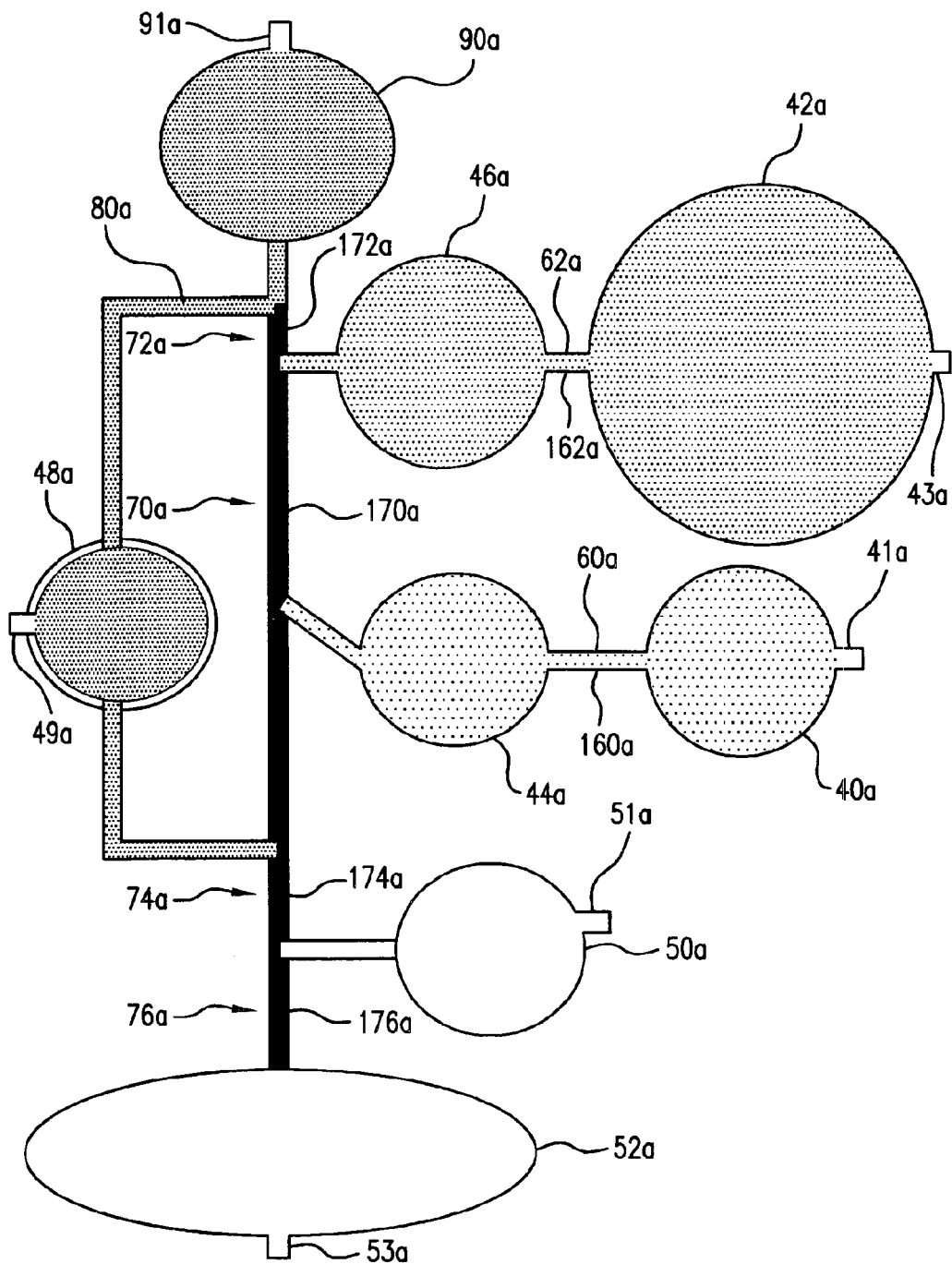
Figure 5E:
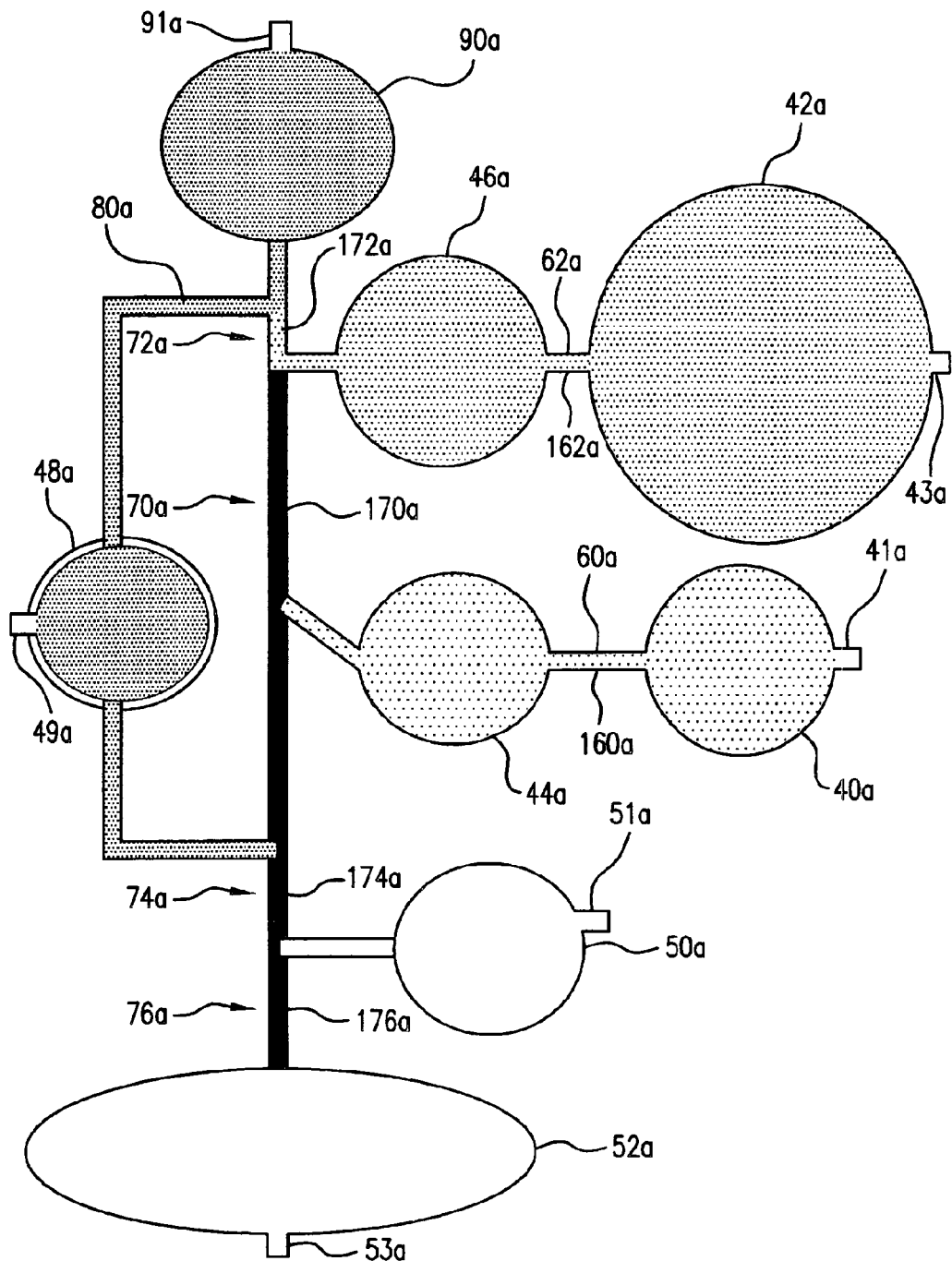
Figure 5F:
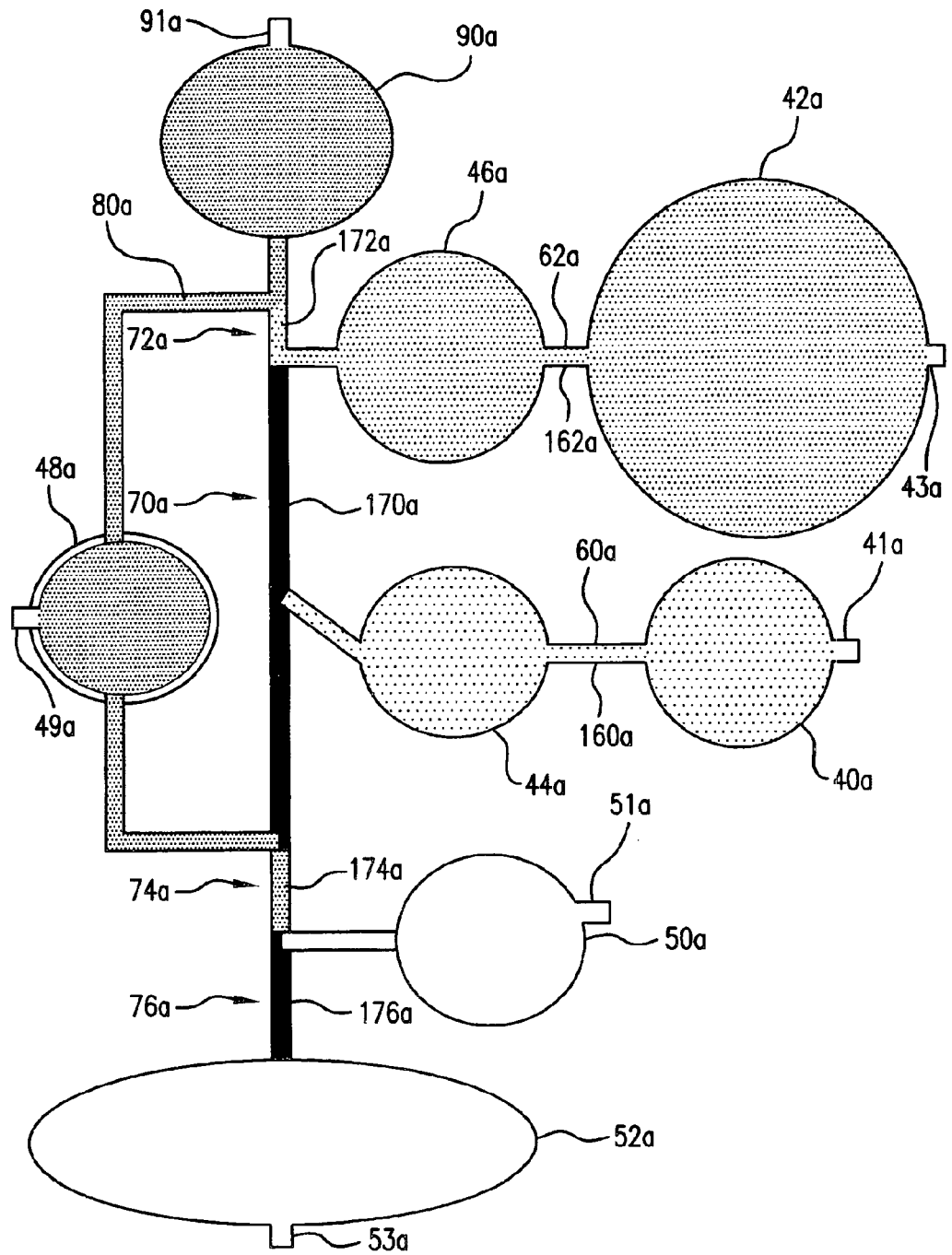
Figure 5G:
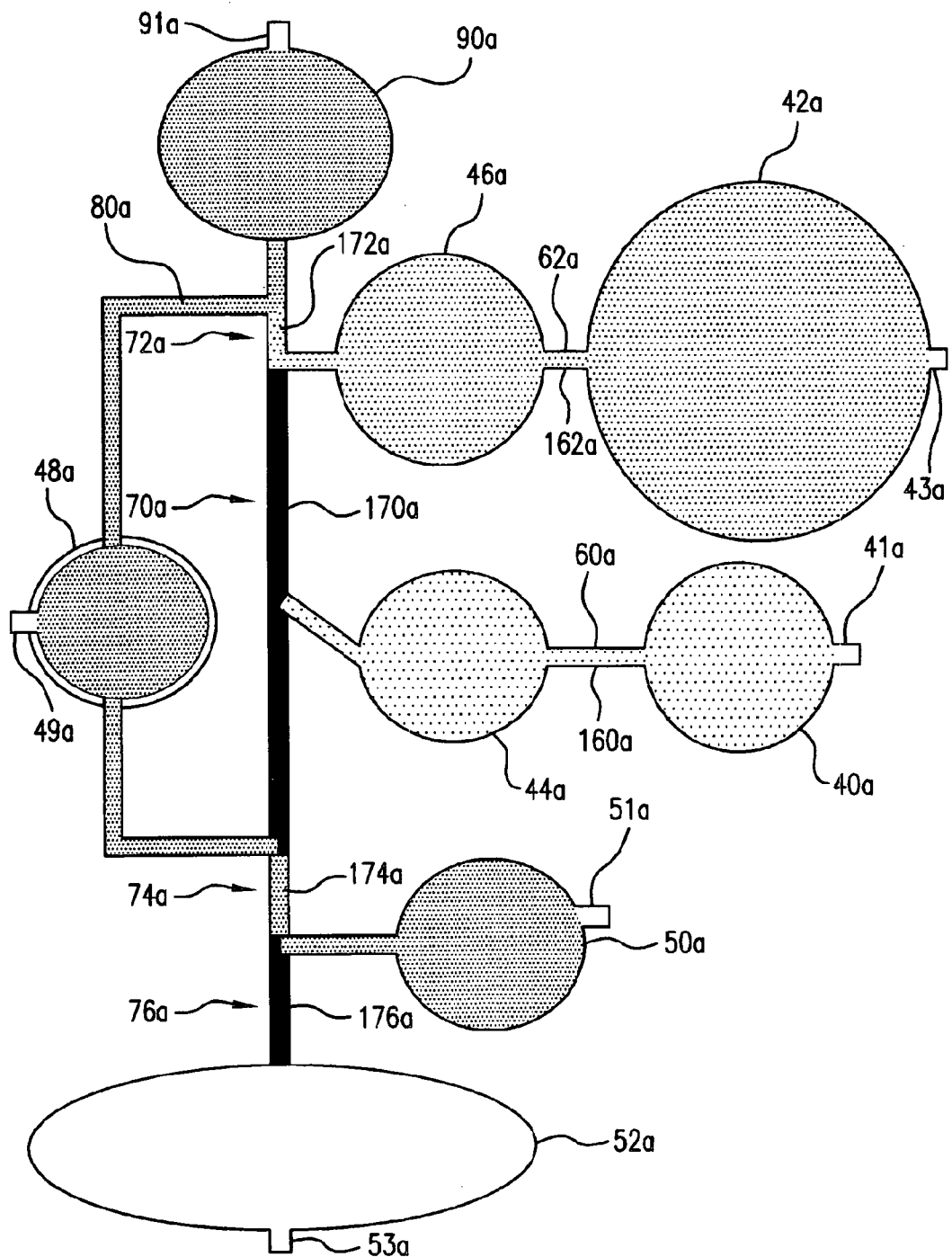
Figure 5H:
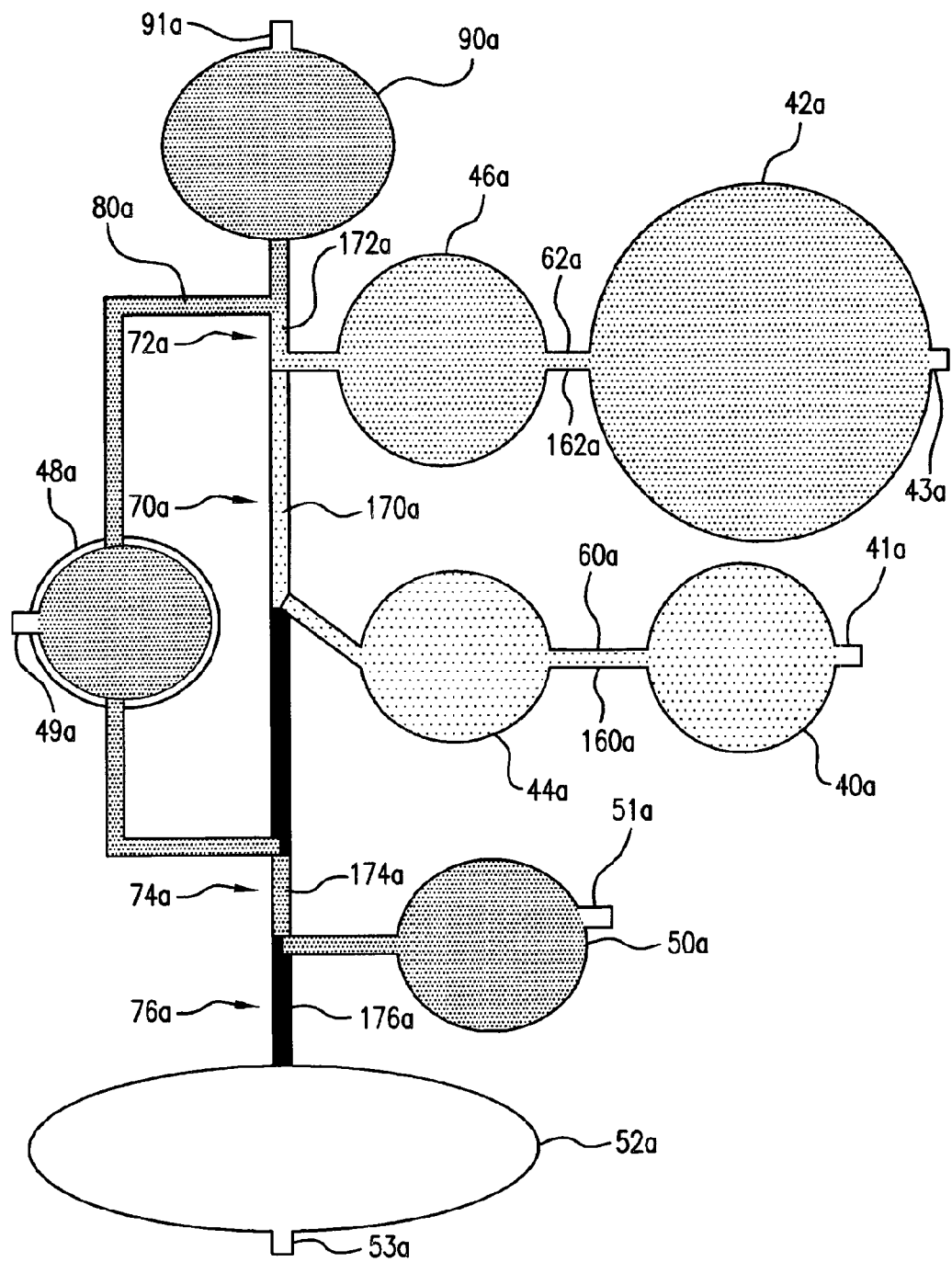
Figure 51:
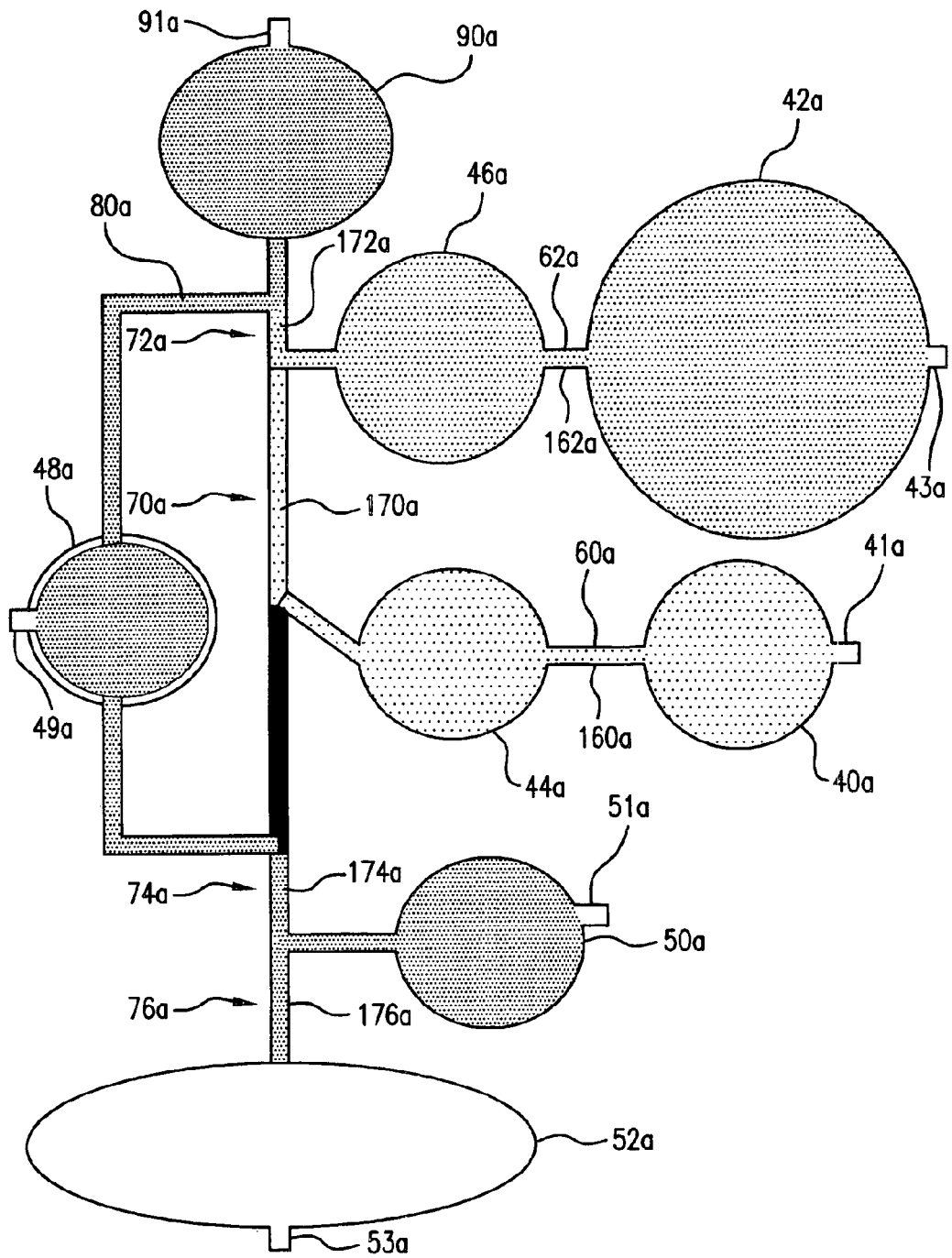
Figure 5J:
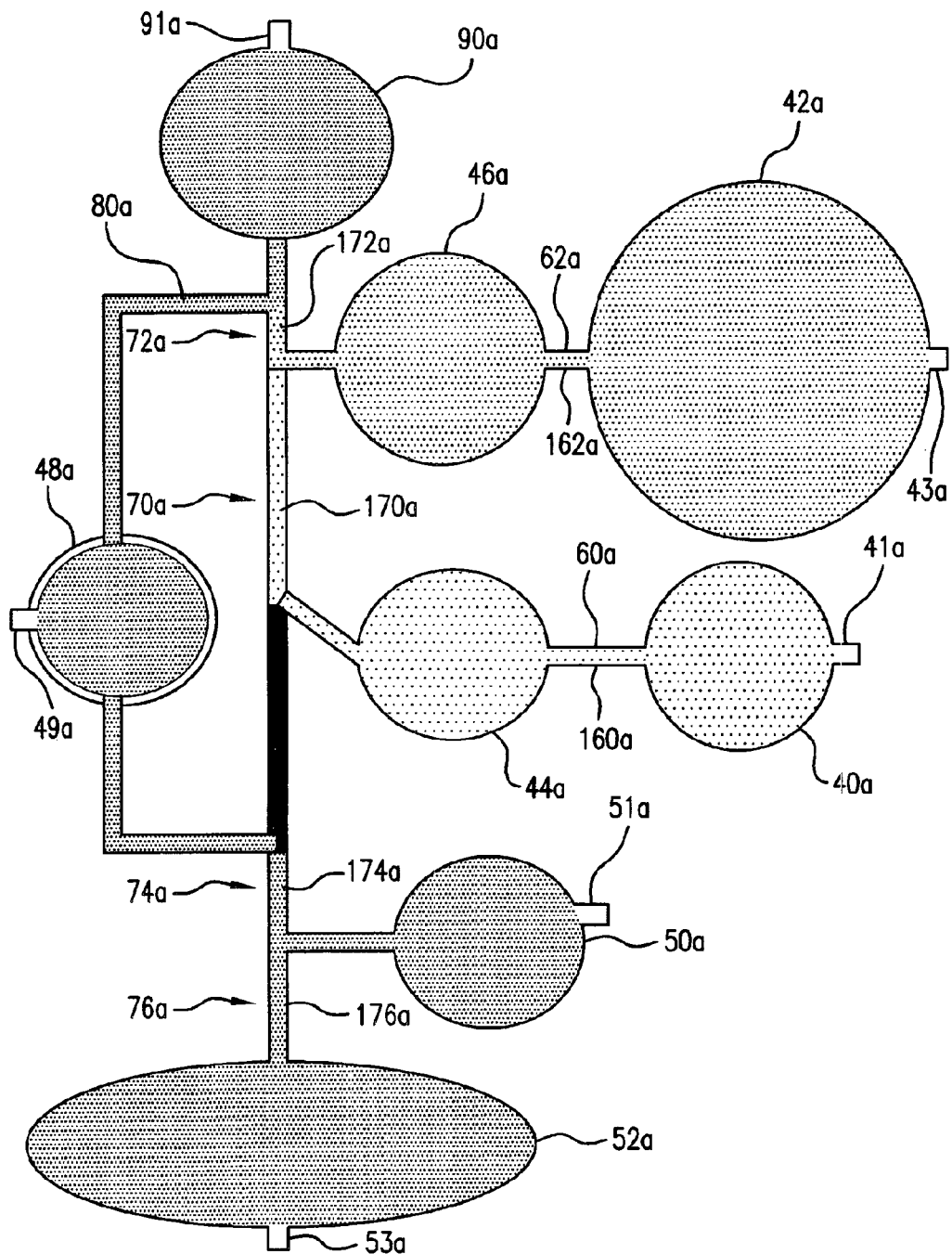

A sample solution can be added to sample retainment region 90a, and supplied to a reaction retainment region 48a through a capillary flow passage 80a, as shown in FIGS. 5C and 5D. Solutions, such as reagents and/or wash buffers, can be dispensed from retainment regions 40a, 42a by pressing on the clear layer of film or other flexible covering over the retainment regions to cause pressure-actuated valves 60a, 62a in passageways 160a, 162a to burst and allow the solutions to move into intermediate retainment regions 44a, 46a. Solution from intermediate retainment region 46a then begins to act on solute bridge valve 72a in fluid processing passageway 172a, opening up a passageway for the solution to enter passage 80a and reaction retainment region 48a, as shown in FIGS. 5D, 5E, 5F and 5G. FIG. 5H illustrates solution from retainment region 44a dissolving, or otherwise reducing the volume of solute bridge valve 70a in passageway 170a. Solute bridge valve 74a in passageway 174a has also dissolved in FIG. 5H to allow solution from the reaction retainment region 48a to pass to a waste retainment region 50a. As described above with regard to the embodiment of FIG. 2, the flow of solution from reaction retainment region 48a to the waste retainment region 50a creates a suction that draws more solution from retainment region 46a through passageway 172a and passageway 80a into the reaction retainment region 48a, as shown in FIG. 5I. Solute bridge valve 76a in passageway 176a then dissolves, allowing solution to flow to waste retainment region 52a, and creating suction that draws solution from retainment region 44a into reaction retainment region 48a, as well as drawing additional solution from retainment region 46a and additional sample from retainment region 90a, as shown in FIG. 5J. For example, vents 41 and 43 are needed in 40 and 42, respectively, (FIG. 4A) in order to allow 120 and 124 to flow into 44 and 46, respectively. Likewise, vent 91 is needed in communication with region 90. A vent 49 can be provided in communication with regions 48 (FIG. 4D) such that 120, 124 and 126 can flow into it. Without a vent, the air trapped in 48 can prevent any inflow of liquid. The same can apply to regions 50 and 52.

The arrangement of retainment regions, passageways and valves of the various embodiments exemplified in FIG. 3 provides for ease of manufacturing. As shown in FIG. 3 and FIGS. 5A-5J, the solute bridge valves 70a, 72a, 74a, and 76a, can be aligned with each other such that the solute bridge valves can be formed as one length of material. The diagnostic device 130 shown in FIG. 6 exemplifies an embodiment wherein the solute bridge valves are formed as one extended length of solute bridge valve material 270 in a substrate 134 separate from a substrate 132, within which various retainment regions such as retainment regions 140 and 142 are formed. When the two substrates 132 and 134 are sandwiched together to form the device 130, the length of solute bridge valve material 270 must connect to passageways 260, 262, 264, and 266, as shown in FIG. 7, which passageways are connected to various retainment regions. As illustrated in FIG. 7, even if the two substrates 132, 134 are not perfectly aligned, the length of solute bridge valve material 270 will still connect with the passageways 260, 262, 264, and 266. FIG. 8 illustrates a situation wherein separate substrates for solute bridge valves 370, 372 and passageways 360, 362, 364, and 366, are not perfectly aligned when forming a device as exemplified in the embodiment of FIG. 2. In this situation the solute bridge valves 370, 372 may not connect to passageways 360, 362, and 364, 366, as desired.

Referring to FIG. 9, and according to various embodiments, retainment regions 444, 446, and 448, can be formed in a substrate 440, with retainment region 444 interconnected with retainment region 448 through a passage 470, and retainment region 446 interconnected with retainment region 448 through a passage 472. Solution such as reagents and/or wash buffers can be retained in the retainment regions 444 and 446 by a flexible sheet of material 460 applied over the top surface of substrate 440 and adhered to the top surface by an adhesive layer 462. Pressure actuated valves 470a, 472a can be positioned in the passageways 470, 472 such that pressure applied to the solutions in retainment regions 444, 446 by pressing down on the flexible sheet 460 over the respective retainment regions will dispense the solutions through passages 470, 472 into the retainment region 448. A barrier 450 can define an inner retainment region 430 and provide an automatically controlled interaction between the solution or solutions 442 in the retainment region 448 and a solution retained in the inner retainment region 430. If desired, the barrier 450 can be formed from a solute material such as chitosan that will gradually dissolve and thereby control the interaction between the solution or solutions 442 in outer retainment region 448 and a solution retained in the inner retainment region 430.

According to various embodiments, and as exemplified by the embodiment shown in FIG. 10, a device can comprise a substrate 540 having a retainment region 542 formed in the substrate and covered by a sheet 560 that is adhered to the top surface of the substrate 540 by an adhesive 562. An inner retainment region 530 can be defined within the retainment region 542 by a barrier 550 that can act as a fluid flow modulator between a solution in the outer retainment region 542 and a solution in the inner retainment region 530. The barrier 550 can comprise a portion 552 made from a soluble material, and a portion 554 made from an insoluble material to provide a further degree of automatic control of the interaction between the solutions or other ingredients in retainment regions 542 and 530.

According to various embodiments, and as exemplified in the embodiment shown in FIG. 11, a substrate 700 can be provided with a retaintment region 740 connected through a passage 770 having a pressure actuated valve 772 to a second retainment region 742. Similarly, another retainment region 740a can be connected through a passage 770a having a pressure actuated valve 772a to the second retainment region 742. A star-shaped or otherwise polygonal retainment region 730 can be defined inside of the second retainment region 742 by a barrier 750. All of the retainment regions can be covered by a sheet 760 adhered to the top surface of substrate 700 by an adhesive layer 762. A solution within retainment region 740 can be dispensed through passage 770 by applying pressure to the sheet 760 over the retainment region 740 to force the liquid past the pressure actuated valve 772 into the second retainment region 742. The barrier 750 can comprise a material such as chitosan that gradually dissolves or melts in response to a stimuli such as characteristics of the solution that has been introduced to the second retainment region 742, thereby acting as a fluid flow modulator and providing an automatically controlled interaction between the solution in second retainment region 742 and the solution in retainment region 730.

According to various embodiments, further control of the fluid handling steps can be provided by including various solute structures within the fluid processing passageways and/or the retainment regions. The solute structures can be selected to dissolve over a finite amount of time and change the flow properties of the fluidic circuit. As an example, raised structures (such as pillars of different aspect ratios) made from solute material (such as chitosan) can be fabricated by photolithography inside the various retainment regions and/or flow passageways. The incorporation of these structures can cause the flow paths to have different capillarity and can cause capillary suction pressures of different magnitudes in different parts of the fluidic circuit. The structures can also introduce additional flow resistance, with a variation in the flow resistance depending on the dissolution of the solute structures.

In one example, an array of pillars made of chitosan could be fabricated inside of the waste retainment regions 50, 52, in the embodiment of FIG. 2, or 50a, 52a in the embodiment of FIG. 3, which could, for example, cause higher suction pressure in waste retainment region 50 or 50a by capillary action as compared to the suction pressure into reaction retainment region 48 or 48a. Over time, the solute structures within waste retainment region 50 or 50a would dissolve in the liquid, which could result in the capillary suction pressure into retainment region 50 or 50a reducing over time. Subsequent dissolution of a solute within flow passage 176 between waste retainment region 50 and waste retainment region 52, for example, could then result in the liquid in waste retainment region 50 being pulled into waste retainment region 52 as a result of a larger capillary suction pressure in waste retainment region 52 caused by solute structures in retainment region 52. The pulling can be as a result of a larger capillary suction pressure in waste retainment region 52 caused by solute structures in retainment region 52. The chitosan cannot operate until 74 and 76 in FIG. 2 and 170a, 172a and 174a in FIG. 3 are open. The flow of 120, 125 and 126 in FIG. 2 into 44, 46, and 48, respectively, relies on capillary effect alone, and does not rely on vacuum created by the chitosan in 50 or 52 because neither 76 nor 74 are open. Chitosan can facilitate fluid flow from 48 into 50 and/or 52 without a vent. The flow of 120, 124 or 126 into 44, 46, or 48, respectively, relies on capillary effect that requires air vents to prevent pressure build up.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

What is claimed:

1. A fluid processing device comprising:
   a microfluidic chip comprising a flow passageway;
   a plurality of retainment regions, at least two of the retainment regions each being in fluid communication with the flow passageway; and
   at least one fluid flow modulator configured to be completely filled in the flow passageway, wherein the at least one fluid modulator is configured to prevent any fluid flow and to dissolve when contacted with water, to increase the size of a fluid communication between the at least two retainment regions, wherein the fluid flow modulator is configured to dissolve in a predetermined length of time based on a size of the fluid flow modulator, and wherein the at least one fluid flow modulator comprises a polysaccharide.

2. The fluid processing device of claim 1, wherein the polysaccharide is a water-soluble polysaccharide.

3. The fluid processing device of claim 1, wherein the at least one fluid flow modulator comprise at least one of a fluid flow modulator configured to open or to increase the size of the fluid communication between the at least two retainment regions, and a fluid flow modulator that is configured to close or to decrease the size of the fluid communication between the at least two retainment regions.

4. The fluid processing device of claim 1, wherein at least one of the plurality of retainment regions comprises aqueous fluid retained therein.

5. The fluid processing device of claim 1, wherein the flow passageway is dimensioned sufficient to cause capillary flow of a fluid from at least one of the at least two retainment regions through the flow passageway.

6. The fluid processing device of claim 1, wherein the flow passageway is dimensioned sufficient to cause electrokinetic flow of charged components in a fluid from at least one of the at least two retainment regions through the flow passageway.

7. The fluid processing device of claim 6, further comprising at least two electrodes disposed in the device with the flow passageway therebetween.

8. The fluid processing device of claim 1, further comprising:
   at least one additional retainment region;
   at least one additional flow passageway; and
   at least one valve comprising one or more of a pressure-actuatable valve, configured to be actuated by pressure, and a heat-actuatable valve, configured to be actuatable by heat, arranged in the at least one additional flow passageway, wherein the at least one additional flow passageway is in fluid communication with the at least one additional retainment region and at least one of the plurality of retainment regions.

9. The fluid processing device of claim 1, further comprising at least two electrodes disposed in the device with the flow passageway therebetween.

10. A fluid processing device comprising:
    a microfluidic chip comprising a flow passageway; and
    at least one valve arranged in the flow passageway, the at least one valve comprising a fluid flow modulator configured to be completely filled in the flow passageway so as to prevent any fluid flow, and wherein the fluid flow modulator is configured to dissolve when contacted with water to increase a fluid communication through the flow passageway, wherein the fluid flow modulator is configured to dissolve in a predetermined length of time based on a size of the fluid flow modulator, and wherein the fluid flow modulator comprises a polysaccharide.

11. A fluid processing device comprising:
    a microfluidic chip having a substrate;
    a plurality of retainment regions formed in or on the substrate, comprising at least a first retainment region and a second retainment region;
    a flow passageway; and
    wherein the first retainment region and the second retainment region are in fluid communication with the flow passageway; and
    a fluid flow modulator configured to be completely filled in the flow passageway so as to prevent any fluid flow, and wherein the fluid flow modulator is separating the first retainment region from the second retainment region, wherein said fluid flow modulator comprises a polysaccharide and is configured to dissolve when contacted with water to increase a fluid communication between the first retainment region and the second retainment region, wherein the fluid flow modulator is configured to dissolve in a predetermined amount of time based on a size of the fluid flow modulator.

12. The fluid processing device of claim 11, further comprising:
    at least one additional retainment region;
    at least one flow passageway; and
    at least one valve comprising one or more of a pressure-actuatable valve and a heat-actuatable valve arranged in the at least one flow passageway, wherein the at least one flow passageway is in fluid communication with the at least one additional retainment region and at least one of the plurality of retainment regions.

* * * * *